(12) United States Patent
Atluri et al.

(10) Patent No.: US 10,189,469 B2
(45) Date of Patent: Jan. 29, 2019

(54) METHOD OF CONTROLLING A POWERTRAIN OF A VEHICLE

(71) Applicant: GM GLOBAL TECHNOLOGY OPERATIONS LLC, Detroit, MI (US)

(72) Inventors: Venkata Prasad Atluri, Farmington Hills, MI (US); Suresh Gopalakrishnan, Troy, MI (US); Michael G. Reynolds, Troy, MI (US); Chandra S. Namuduri, Troy, MI (US); Kenneth J. Shoemaker, Highland, MI (US); David W. Walters, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 733 days.

(21) Appl. No.: 14/663,553

(22) Filed: Mar. 20, 2015

(65) Prior Publication Data
US 2016/0272191 A1    Sep. 22, 2016

(51) Int. Cl.
*F02N 11/00*      (2006.01)
*B60W 20/40*      (2016.01)
(Continued)

(52) U.S. Cl.
CPC ............ *B60W 20/40* (2013.01); *B60K 6/485* (2013.01); *B60W 20/20* (2013.01); *F02N 11/00* (2013.01); *B60W 2510/0604* (2013.01); *B60W 2510/0623* (2013.01); *B60W 2510/101* (2013.01); *B60W 2510/1005* (2013.01);
(Continued)

(58) Field of Classification Search
CPC ....... B60K 6/485; B60W 20/20; B60W 20/40; B60W 2510/0604; B60W 2510/0623; B60W 2510/1005; B60W 2510/101; B60W 2510/182; B60W 2510/244; B60W 2520/10; B60W 2520/105; B60W 2710/06; B60W 2710/08; B60W 2710/242; B60W 2710/244; B60W 2510/10; B60W 2510/109; F02N 11/00; Y02T 10/6226;
(Continued)

(56) References Cited

U.S. PATENT DOCUMENTS 9,108,633 B1 * 8/2015 Atluri .................. B60W 20/10
2011/0104962 A1   5/2011 Krause et al.
(Continued)

FOREIGN PATENT DOCUMENTS

| CN | 103269929 A | 8/2013 |
| CN | 103732463 A | 4/2014 |
| CN | 103963627 A | 8/2014 |
| JP | 2005155251 A | 6/2005 |
| WO | 2014177332 A2 | 11/2014 |

*Primary Examiner* — Stacey A Fluhart
(74) *Attorney, Agent, or Firm* — Quinn IP Law

(57) ABSTRACT

A method of controlling a powertrain of a vehicle includes opening and/or closing one or more of a first switching device, a second switching device, a third switching device, and engaging and/or disengaging at least one of a pair of actuators for a starter mechanism or a motor/generator clutch. Many different control modes are provided for the powertrain by changing the operation of a motor-generator between a motor or a generator, and changing the electrical connections between a first energy storage device, a second energy storage device, an auxiliary electric system, the starter mechanism, and the motor-generator.

29 Claims, 11 Drawing Sheets

(51) Int. Cl.
*B60W 20/20* (2016.01)
*B60K 6/485* (2007.10)

(52) U.S. Cl.
CPC . *B60W 2510/109* (2013.01); *B60W 2510/182* (2013.01); *B60W 2510/244* (2013.01); *B60W 2520/10* (2013.01); *B60W 2520/105* (2013.01); *B60W 2710/06* (2013.01); *B60W 2710/08* (2013.01); *B60W 2710/242* (2013.01); *B60W 2710/244* (2013.01); *Y02T 10/6226* (2013.01); *Y10S 903/93* (2013.01)

(58) Field of Classification Search
CPC .......... Y02T 903/93; B30W 30/18018; B30W 30/18027
See application file for complete search history.

(56) References Cited

U.S. PATENT DOCUMENTS

| | | | | |
|---|---|---|---|---|
| 2012/0041630 | A1* | 2/2012 | Yamamoto | B60K 6/365 701/22 |
| 2013/0066492 | A1* | 3/2013 | Holmes | B60W 20/00 701/22 |
| 2013/0085634 | A1* | 4/2013 | Jinbo | B60W 10/02 701/22 |
| 2013/0297191 | A1* | 11/2013 | Gibson | F02N 11/0855 701/112 |
| 2015/0258973 | A1* | 9/2015 | Hawkins | B60W 10/06 701/22 |
| 2015/0314777 | A1* | 11/2015 | Koike | B60K 6/442 701/22 |

\* cited by examiner

METHOD OF CONTROLLING A POWERTRAIN OF A VEHICLE

TECHNICAL FIELD

The present disclosure relates to a method of controlling a powertrain of a hybrid vehicle.

BACKGROUND

A vehicle can include an internal combustion engine coupled to a transmission and a final drive to rotate wheels that move the vehicle. To start the engine of a non-hybrid vehicle, a starter motor can be energized which causes a crankshaft of the engine to turn and start the engine.

A hybrid electric vehicle utilizes both an electric motor-generator and an internal combustion engine to offer reduced fuel consumption and emissions. One type of hybrid electric vehicle utilizes a belted-alternator-starter (BAS). The BAS utilizes a motor-generator coupled to a crankshaft of the engine usually by a belt and pulley system. The motor-generator can restart the engine when a brake is released at a stop light and the motor-generator can be rotated by the engine during regenerative braking. This type of hybrid vehicle utilizes a starter motor independent of the motor-generator to start the engine when the engine has been shut off for an extended period of time. The starter motor and the motor-generator operate separately, i.e., not coupleable to each other.

The BAS can be in electrical communication with at least a first energy storage device. The vehicle can have an electrical system that runs various vehicle accessories such as headlights, HVAC devices, auxiliary motors and entertainment system components. Any current exiting the BAS is fed to the first energy storage device before the current can reach the electrical system, and thus, the electrical system is not powered directly by the BAS.

SUMMARY

A method of controlling a powertrain of a vehicle is provided. The powertrain includes an internal combustion engine, a motor-generator coupled to the engine and having at least one actuator for connecting the motor-generator with the engine, a starter mechanism coupled to a crankshaft of the engine and having at least one actuator for engaging the starter mechanism with the crankshaft, at least one energy storage device, and at least one switch for connecting the at least one energy storage device to the motor-generator or the starter mechanism. The method includes sensing a plurality of operating conditions of the vehicle, an operating mode of a transmission, with a vehicle controller. The operating mode of the transmission is sensed to determine if the transmission is currently disposed in one of either a reverse drive mode or a forward drive mode, or if the transmission is not currently disposed in either of the reverse drive mode or the forward drive mode. When the transmission is currently disposed in one of the reverse drive mode or the forward drive mode, the vehicle controller selects a desired control mode, from a plurality of available control modes, based on the current operating conditions of the vehicle. The vehicle controller then controls a position of the at least one switch, engagement of the at least one actuator of the starter mechanism, and engagement of the at least one actuator of the motor-generator, to configure the powertrain in the desired control mode. When the transmission is not currently disposed in either of the reverse drive mode or the forward drive mode, movement of the vehicle and a fueling state of the engine are sensed, with the vehicle controller, to determine if the vehicle is executing an autostop, or if the vehicle is not currently executing an autostop. An autostop is an event in which the vehicle is not moving and the engine is not being fueled and is not running. When the transmission is not currently disposed in either of the reverse drive mode or the forward drive mode, and if the vehicle controller determines that the vehicle is currently executing an autostop, the vehicle controller controls a position of the at least one switch, engagement of the at least one actuator of the starter mechanism, and engagement of the at least one actuator of the motor-generator, to configure the powertrain in an autostop control mode. When the transmission is not currently disposed in either of the reverse drive mode or the forward drive mode, and when the vehicle is not currently executing an autostop, the vehicle controller controls a position of the at least one switch, engagement of the at least one actuator of the starter mechanism, and engagement of the at least one actuator of the motor-generator, to configure the powertrain in a discharge control mode to off-load the motor-generator.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
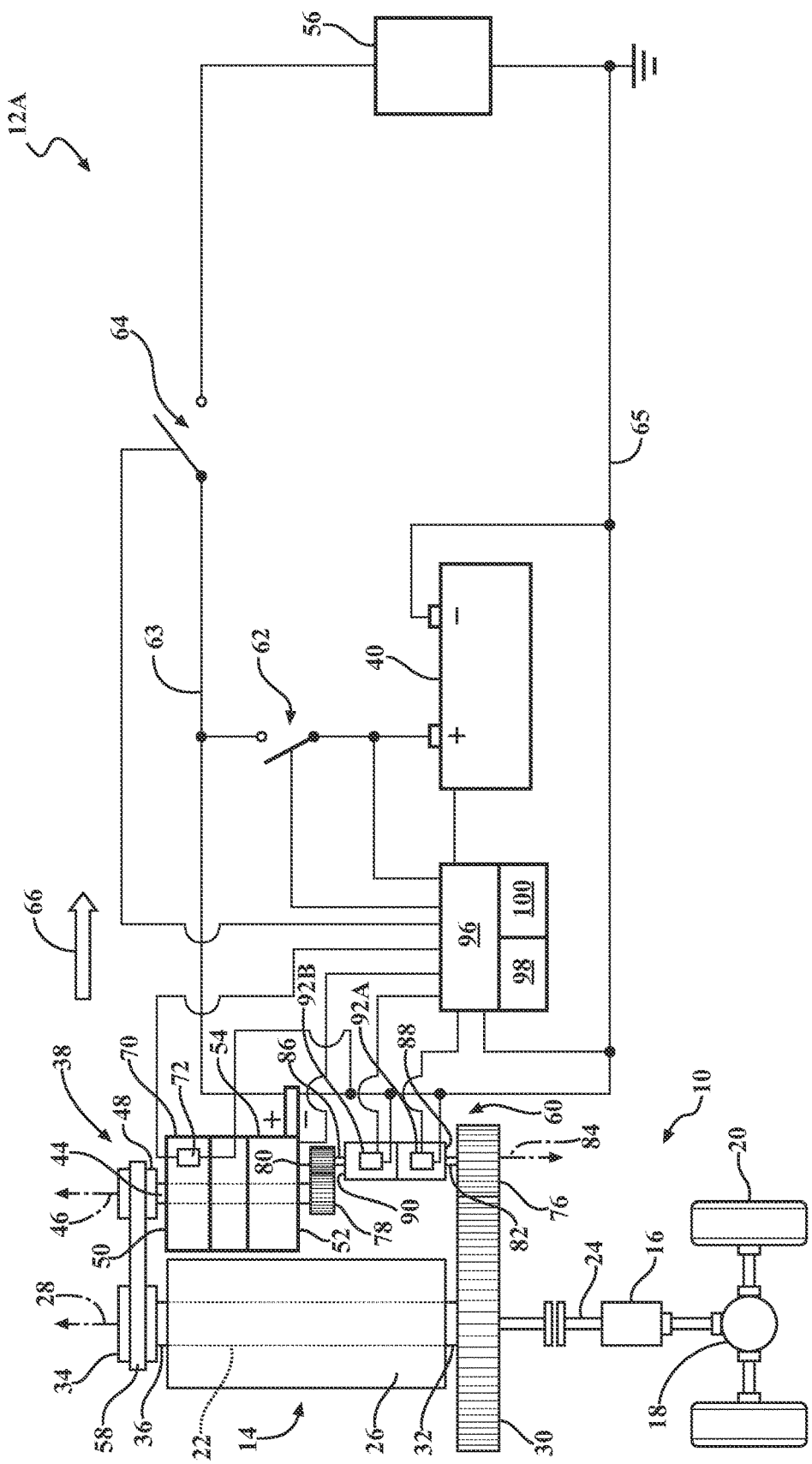
FIG. 1 is a schematic illustration of a vehicle including a powertrain of a first configuration, having one energy storage device, and a starter mechanism selectively connecting a motor-generator and a crankshaft of an engine for starting the engine.

Referring to the Figures, wherein like numerals indicate like or corresponding parts throughout the several views, a vehicle is generally shown at 10. A plurality of embodiments of a powertrain 12A, 12B, 12C, 12D for the vehicle 10 are generally shown in the Figures. The vehicle 10 that can utilize the powertrain 12A, 12B, 12C, 12D can be an automotive vehicle, such as, a car, a truck, etc. It is to be appreciated that the vehicle 10 can alternatively be a non-automotive vehicle, such as, a farm vehicle, a marine vehicle, an aviation vehicle, etc.

Generally, as shown in the Figures, the powertrain 12A, 12B, 12C, 12D for each of the embodiments herein can include an engine 14, a transmission 16 and a final drive 18 coupleable to each other to rotate wheels 20 of the vehicle 10 to propel the vehicle 10. The engine 14 can include an output member 22 or crankshaft 22 which is coupleable to an input member 24 of the transmission 16. The transmission 16 can include a gearing arrangement and one or more clutches through which torque is transferred from the output member 22 of the engine 14 to the input member 24 of the transmission 16, then to the final drive 18 and out to the wheels 20 to move the vehicle 10. The wheels 20 can be front wheels or rear wheels of the vehicle 10. The front and/or the rear wheels 20 can be powered by the powertrain 12A, 12B, 12C, 12D.

The powertrain 12A, 12B, 12C, 12D of each of the embodiments (shown in FIGS. 1-4) includes the engine 14 as discussed above. For example, the engine 14 can be an internal combustion engine. The engine 14 can include a housing 26 and the crankshaft 22 at least partially disposed inside the housing 26. The crankshaft 22 is rotatable about a longitudinal axis 28. In the Figures, the crankshaft 22 is shown schematically without any specific features for illustrative purposes only and it is to be appreciated that the crankshaft 22 can have various configurations to cooperate with other components of the engine 14. The engine 14 can also include a cylinder block, one or more connecting rods, pistons, valves, etc., which will not be discussed further. It is to be appreciated that the engine 14 can be designed to operate on gasoline, diesel fuel, etc.

Continuing with FIGS. 1-4, the powertrain 12A, 12B, 12C, 12D of each of the embodiments can include a ring gear 30. In certain embodiments, the ring gear 30 is disposed outside of the housing 26. The ring gear 30 is attached to a first distal end 32 of the crankshaft 22 such that the ring gear 30 and the crankshaft 22 are rotatable in unison about the longitudinal axis 28. Simply stated, the ring gear 30 and the crankshaft 22 can rotate as a unit about the longitudinal axis 28.

Additionally, the powertrain 12A, 12B, 12C, 12D of each of the embodiments (see FIGS. 1-4) can include a rotatable element 34, such as a crankshaft pulley 34, which is rotatable about the longitudinal axis 28. In certain embodiments, the crankshaft pulley 34 is disposed outside of the housing 26 of the engine 14. The crankshaft pulley 34 is coupleable to a second distal end 36 of the crankshaft 22 such that the crankshaft pulley 34 and the crankshaft 22 can be rotatable in unison about the longitudinal axis 28. Specifically, coupleable can include when the crankshaft pulley 34 is directly coupled to the crankshaft 22 or indirectly coupled to the crankshaft 22 by the operation of another mechanism, such as clutching, as discussed further below. Generally, the first and second distal ends 32, 36 of the crankshaft 22 are spaced from each other along the longitudinal axis 28. It is to be appreciated that one or more bearings can rotatably support the crankshaft 22. It is to also be appreciated that the rotatable element 34 can be a sprocket, etc., instead of a pulley.

Furthermore, the powertrain 12A, 12B, 12C, 12D of each of the embodiments (see FIGS. 1-4) includes a motor-generator 38 coupleable to the engine 14. For example, the motor-generator 38 can be coupled to the outside of the housing 26 of the engine 14 and/or supported by any suitable component adjacent to the engine 14. The motor-generator 38 can be supported by any suitable methods, such as fasteners, brackets, braces, etc. The motor-generator 38 can operate as a motor or as a generator. The powertrain 12A, 12B, 12C, 12D can be referred to as a hybrid powertrain because the powertrain 12A, 12B, 12C, 12D utilizes the motor-generator 38 which can assist in reducing fuel consumption and emissions of the vehicle 10. For example, in certain embodiments, the motor-generator 38 can be utilized as a motor to start the engine 14 or as a torque assist which provides torque to the crankshaft 22 to assist in propelling the vehicle 10 when the vehicle 10 is moving (utilizing an endless rotatable device 58 discussed below). As another example, the motor-generator 38 can be utilized as a generator to generate current, i.e., electricity, or recharge a first energy storage device 40 and/or a second energy storage device 42, as discussed further below. When the motor-generator 38 is generating current/electricity, the current can drive various auxiliary devices of the vehicle 10, which is also discussed further below. One suitable motor-generator 38 is a brushless electric motor-generator. Additionally, the motor-generator 38 can be an alternating current (AC) motor-generator or any other suitable motor-generator.

As shown in the Figures, the motor-generator 38 can include a motor/generator shaft 44 that can be rotatable about a first axis 46. In certain operations, when the motor/generator shaft 44 rotates, torque can be transferred to the crankshaft 24 as discussed further below. Furthermore, the motor/generator shaft 44 does not move along the first axis 46. Additionally, the first axis 46 is spaced from the longitudinal axis 28. In certain embodiments, the first axis 46 and the longitudinal axis 28 are spaced from each other and substantially parallel to each other. Therefore, the motor/generator shaft 44 and the crankshaft 22 are offset from each other. It is to be appreciated that the motor/generator shaft 44 can be split into more than one piece, e.g., more than one piece to accommodate the operation of one or more clutches, etc.

Continuing with FIGS. 1-4, the motor-generator 38 can include a rotatable element 48, such as a motor/generator pulley 48, being coupleable to the motor/generator shaft 44 adjacent to a first end 50 of the motor-generator 38. Specifically, the motor/generator pulley 48 can be disposed outside of the first end 50 of the motor-generator 38. The motor/generator pulley 48 can also be rotatable about the first axis 46. For certain operations, the motor/generator shaft 44 and the motor/generator pulley 48 can rotate in unison about the first axis 46. In other operations, the motor/generator shaft 44 and the motor/generator pulley 48 are not rotatable in unison, i.e., rotatable separately or one rotatable while the other remains stationary (does not rotate). Coupleable can include when the motor/generator pulley 48 is directly coupled to the motor/generator shaft 44 or indirectly coupled to the motor/generator shaft 44 by the operation of another mechanism, such as clutching, as discussed further below.

In certain embodiments, the motor/generator shaft 44 can extend out of a second end 52 of the motor-generator 38. Generally, the first and second ends 50, 52 of the motor-generator 38 are spaced from each other along the first axis 46. Specifically, the motor-generator 38 can include a housing having the first and second ends 50, 52. Therefore, the motor/generator shaft 44 is at least partially disposed inside the housing of the motor-generator 38. It is to be appreciated that one or more bearings can rotatably support the motor/generator shaft 44. It is to also be appreciated that the rotatable element 48 can be a sprocket, etc., instead of a pulley.

The motor-generator 38 of each of these powertrain 12A, 12B, 12C, 12D embodiments shown in FIGS. 1-4 can include a stator and a rotor spaced from the stator. The rotor is attached to the motor/generator shaft 44 such that the rotor and the motor/generator shaft 44 are rotatable in unison about the first axis 46 relative to the stator. Simply stated, the rotor and the motor/generator shaft 44 are rotatable as a unit about the first axis 46 while the stator remains stationary. The stator is in electrical communication with the first and/or second energy storage devices 40, 42. For example, when the motor-generator 38 is functioning as the motor, current stored in the first and/or second energy storage devices 40, 42 can be supplied to the stator/rotor to cause rotation of the rotor and ultimately start the engine 14 for the embodiments of FIGS. 1 and 2, and in certain situations, can start the engine 14 for the embodiment of FIGS. 3 and 4. As another example, for all of the embodiments herein, when the motor-generator 38 is functioning as the generator, torque from the rotor rotating about the first axis 46 is converted into electrical current which can be stored in the first and/or second energy storage devices 40, 42 for later use.

The motor-generator 38 can operate in various modes to perform various functions. For example, the motor-generator 38 can operate in a generating mode to generate current by rotating the rotor of the motor-generator 38 relative to the stator of the motor-generator 38. Simply stated, the motor-generator 38 can operate as a generator when in the generating mode. The generating mode can occur when the vehicle 10 is motoring at a certain speed and is not braking/slowing down the vehicle 10. As another example, the motor-generator 38 can operate in a torque assist mode to provide torque to the wheels 20 of the vehicle 10 (utilizing an endless rotatable device 58 discussed below). Simply stated, the motor-generator 38 can operate as a motor when in the torque assist mode. As yet another example, the motor-generator 38 can operate in a regenerative braking mode to generate current during braking, i.e., slowing down, of the vehicle 10 by rotating the rotor of the motor-generator 38 relative to the stator of the motor-generator 38. Simply stated, the motor-generator 38 can operate as a generator when in the regenerative braking mode.

Referring to FIGS. 1-4, the motor-generator 38 of each of these embodiments can also include an electrical device that can include an integrated power inverter 54. The stator can be in electrical communication with the integrated power inverter 54, and the integrated power inverter 54 can be selectively in electrical communication with the first and/or second energy storage devices 40, 42. The integrated power inverter 54 can convert direct current (DC) provided by the first and/or second energy storage devices 40, 42 to alternating current (AC) to power the motor-generator 38 to function as the motor. Furthermore, the integrated power inverter 54 can convert AC to DC to be stored in the first and/or second energy storage devices 40, 42 when the motor-generator 38 functions as the generator. Additionally, the integrated power inverter 54 can convert AC to DC to supply current to an auxiliary electric system 56. Also, the integrated power inverter 54 can convert AC to DC to selectively supply current to the first and/or second energy storage devices 40, 42. Generally, the integrated power inverter 54 can be in electrical communication with the stator to operate the motor-generator 38 as the motor or as the generator. The motor-generator 38 can include other electrical devices, such as one or more sensors (such as for example, a motor position sensor that detects the position of the motor/generator shaft 44), controllers, fans to cool electrical components, etc. Furthermore, the integrated power inverter can include one or more brushes, one or more brush holders, a field control electronic device when using a wound field machine, etc.

Continuing with FIGS. 1-4, each of the embodiments of the powertrain 12A, 12B, 12C, 12D can further include an endless rotatable device 58, i.e., a device having no ends, disposed about the crankshaft pulley 34 and the motor/generator pulley 48. Specifically, the endless rotatable device 58 is disposed about the crankshaft pulley 34 and the motor/generator pulley 48 to transfer rotational movement between the crankshaft pulley 34 and the motor/generator pulley 48. In other words, the endless rotatable device 58 is disposed about the crankshaft pulley 34 and the motor/generator pulley 48 to selectively transfer torque between the crankshaft 22 and the motor/generator shaft 44. For example, in certain operations, rotation of the motor/generator pulley 48 by the endless rotatable device 58 can correspondingly rotate the motor/generator shaft 44, etc.

In certain embodiments, the endless rotatable device 58 is a belt. The belt can be a ribbed belt, a flat belt or any other suitable configuration. The motor-generator 38 can be coupled to the engine 14 by the endless rotatable device 58. Specifically, the motor-generator 38 can be coupled to the crankshaft 22 of the engine 14 by the endless rotatable device 58 and the pulleys 34, 48. In certain embodiments, the endless rotatable device 58 can be a chain instead of the belt and sprockets can be utilized with the chain instead of the pulleys 34, 48.

Figure 2:
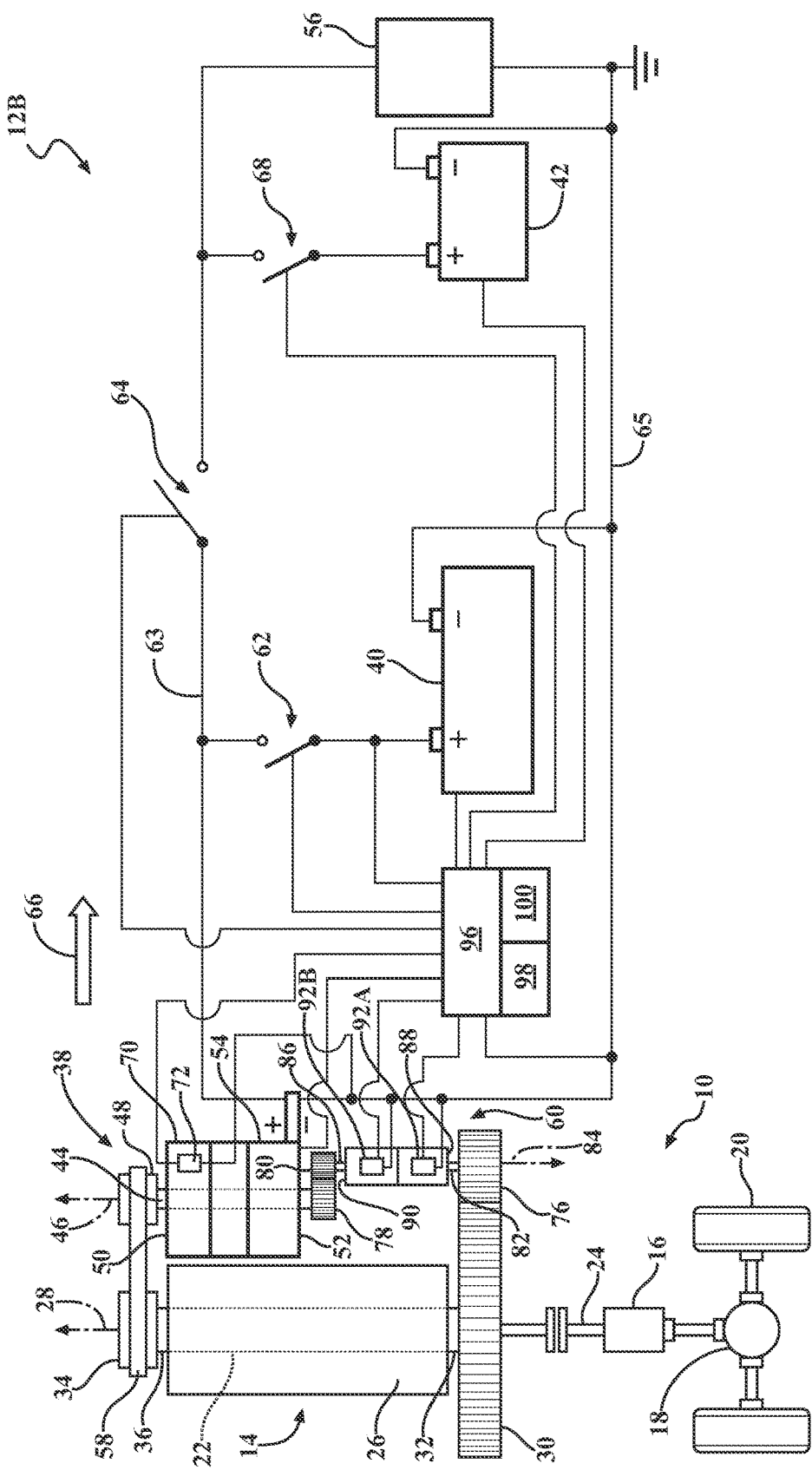
FIG. 2 is a schematic illustration of the vehicle including a powertrain of a second configuration, having two energy storage devices, and the starter mechanism shown in FIG. 1.
Figure 3:
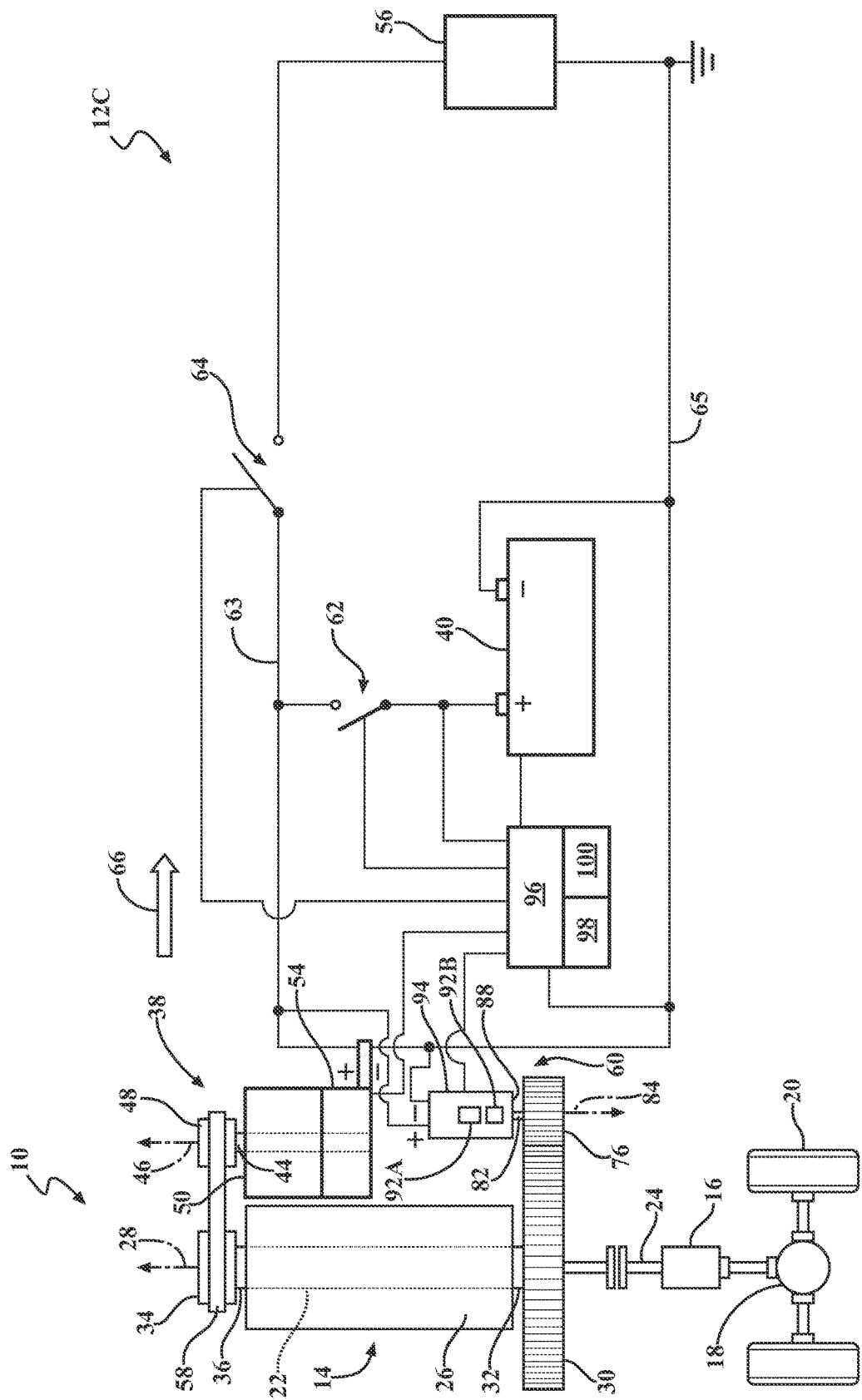
FIG. 3 is a schematic illustration of the vehicle including a powertrain of a third configuration, having one energy storage device, and a starter motor, independent from the motor-generator, for starting the engine.
Figure 4:
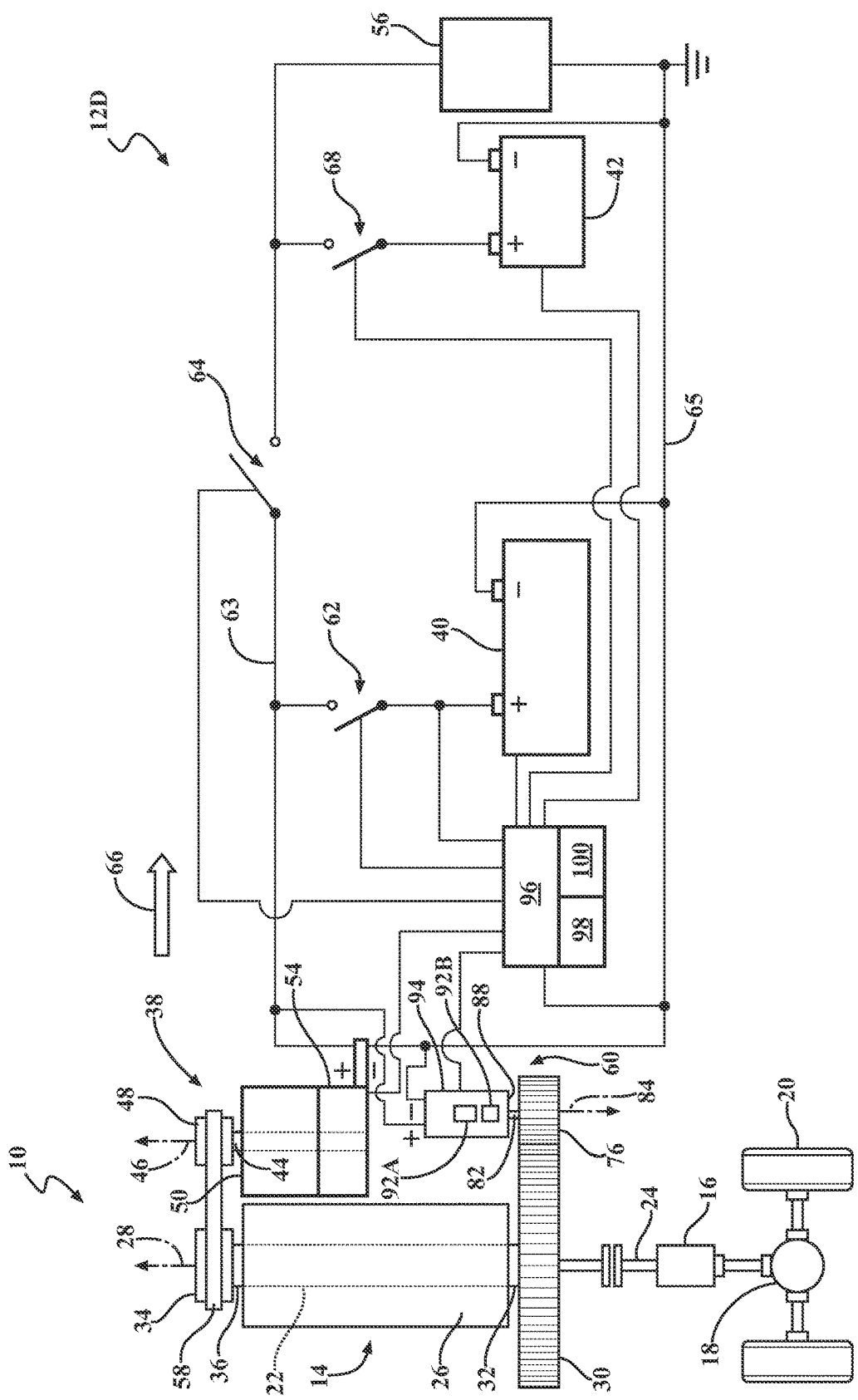
FIG. 4 is a schematic illustration of the vehicle including a powertrain of a fourth configuration, having two energy storage devices, and the starter motor shown in FIG. 3.

Referring to FIGS. 1-4, the powertrain 12A, 12B, 12C, 12D of each of the embodiments also includes a starter mechanism 60 coupleable to the engine 14. The starter mechanism 60 can be various configurations. For example, the starter mechanism 60 can be in one configuration as shown in FIGS. 1 and 2. Alternatively, the starter mechanism 60 can be in another configuration as shown in FIGS. 3 and 4. It should be appreciated that other configurations of the starter mechanism 60 are possible, and that the configuration of the starter mechanism 60 is not limited to the exemplary embodiments shown in the Figures and described herein. The starter mechanism 60 for each of the embodiments can include a first starter gear 76 and each of the exemplary configurations of the starter mechanism 60 are discussed in detail below. The starter mechanism 60 is coupleable to the engine 14 through engagement of the first starter gear 76 with the ring gear 30 as also discussed below. Furthermore, the motor-generator 38 may be coupleable to the engine 14 through the starter mechanism 60, such as described in the powertrain embodiments 12A, 12B of FIGS. 1 and 2.

Furthermore, the powertrain 12A, 12B, 12C, 12D of each of the embodiments can include the auxiliary electric system 56 in electrical communication with the motor-generator 38. The auxiliary electric system 56 can include one or more accessory devices of the vehicle 10. For example, the auxiliary electric system 56 can include headlights, HVAC devices, auxiliary motors, entertainment system components, etc. In certain embodiments, the integrated power inverter 54 is in electrical communication with the auxiliary electric system 56 to convert AC produced by the motor-generator 38 to DC. Therefore, the DC can be utilized by the auxiliary electric system 56 to power various accessories.

Continuing with FIGS. 1-4, the powertrain 12A, 12B, 12C, 12D of each of the embodiments includes the first energy storage device 40, which is disposed in a parallel electrical relationship with the motor-generator 38 and the auxiliary electric system 56. In other words, the first energy storage device 40 is disposed in a parallel circuit arrangement with the motor-generator 38 and the auxiliary electric system 56. The first energy storage device 40 can be any suitable battery or other device that can store current for later use.

The powertrain 12A, 12B, 12C, 12D of each of the embodiments also include a first switching device 62 selectively transitionable between a first open state to electrically disconnect the first energy storage device 40 from at least one of the motor-generator 38, the starter mechanism 60, and/or the auxiliary electric system 56, and a first closed state to electrically connect the first energy storage device 40 to at least one of the motor-generator 38, starter mechanism 60, and/or the auxiliary electric system 56. Therefore, electrical communication between the motor-generator 38 and the auxiliary electric system 56 is independent of the first switching device 62 being in the first open and closed states. Therefore, the location of the first switching device 62 does not interfere with the electrical communication between the motor-generator 38 and the auxiliary electric system 56. In other words, the motor-generator 38 and the auxiliary electric system 56 can be in electrical communication with each other independently of which state the first switching device 62 is in. The first energy storage device 62 is disposed between an electrical bus 63 and an electrical ground 65, and the first switching device 62 is disposed between the first energy storage device 62 and the electrical bus 63 such that the first energy storage device 62 is in direct electrical communication with the electrical bus 63 when the first switching device 62 is in the first closed state. The electrical bus 63 can be a high-voltage DC bus and/or a low-voltage DC bus.

The phrase "at least one of" as used herein should be construed to include the non-exclusive logical "or", i.e., at least one of the motor-generator 38 or the auxiliary electric system 56. Therefore, in certain embodiments, the first energy storage device 40 is in electrical communication with the motor-generator 38 or the auxiliary electric system 56. In other embodiments, the first energy storage device 40 is in electrical communication with both of the motor-generator 38 and the auxiliary electric system 56.

In general, for embodiments of the powertrain 12A, 12B, 12C, 12D, the first switching device 62 is used to selectively block the flow of current to the first energy storage device 40. When the first switching device 62 is in the first closed state, the electrical circuit to the first energy storage device 40 is completed or closed and current can flow to or from the first energy storage device 40. When the first switching device 62 is in the first open state, the electrical circuit is separated or open and current cannot flow to or from the first energy storage device 40. The first open state is shown in solid lines in the Figures and the first closed state is shown as dashed lines in the Figures.

The first switching device 62 for all of these embodiments of the powertrain 12A, 12B, 12C, 12D can be a unidirectional blocking switch or a bidirectional blocking switch. In one configuration, the first switching device 62 is a solid-state switch. The first switching device 62 can be a binary switch, a contact switch, a relay switch, etc. The first switching device 62 is schematically illustrated in the Figures for illustrative purposes only and should not be construed as any particular type of switch.

The powertrain 12B, 12D for the embodiments of FIGS. 2, and 4, includes the second energy storage device 42 disposed in a parallel electrical relationship with the first energy storage device 40, the motor-generator 38, the starter mechanism 60, and/or the auxiliary electric system 56. In other words, the second energy storage device 42 is disposed in a parallel circuit arrangement with the motor-generator 38, the starter mechanism 60, and the auxiliary electric system 56.

Generally, the first energy storage device 40 is a high-voltage energy storage device, and the second energy storage device 42 is a low-voltage energy storage device that is in electrical communication with the auxiliary electric system 56. The first energy storage device 40 is utilized to selectively supply current/voltage to the motor-generator 38 and the second energy storage device 42 is utilized to selectively supply current/voltage to the auxiliary electric system 56. The first energy storage device 40 and second energy storage devices 42 can be any suitable battery or other device that can store current or energy for later use. One non-limiting example is that the high-voltage energy storage device can be a 48 volt DC battery and the low-voltage energy storage device can be a 12 volt DC battery. Another non-limiting example is the high-voltage energy storage device can be a 24-48 volt DC multi-cell rechargeable lithium ion battery or an ultracapacitor, while the low-voltage energy storage device can be a 12 volt DC lead acid or lithium ion battery. As yet another example, the first and second energy storage devices 40, 42 can have substantially the same voltage levels.

Furthermore, the embodiments of the powertrain 12B, 12D shown in FIGS. 2 and 4 include a second switching device 68 selectively transitionable between a second open state to electrically disconnect the second energy storage device 42 from at least one of the motor-generator 38, the starter mechanism 60, and/or the auxiliary electric system 56, and a second closed state to electrically connect the second energy storage device 42 to at least one of the motor-generator 38, the starter mechanism 60, and/or the auxiliary electric system 56. Electrical communication between the motor-generator 38 and the auxiliary electric system 56 is independent of the second switching device 68 being in the second open and closed states. Therefore, the location of the second switching device 68 does not interfere with the electrical communication between the motor-generator 38 and the auxiliary electric system 56. In other words, the motor-generator 38 and the auxiliary electric system 56 can be in electrical communication with each other independently of which state the second switching device 68 is in. The second energy storage device 42 is disposed between the electrical bus 63 and the electrical ground 65, and the second switching device 68 is disposed between the second energy storage device 42 and the electrical bus 63 such that the second energy storage device 42 is in direct electrical communication with the electrical bus 63 when the second switching device 68 is in the second closed state. Therefore, due to the location of the first and second switching devices 62, 68, current can selectively flow to/from the first and second energy storage devices 40, 42 independently of each other.

As discussed above, the phrase "at least one of" should be construed to include the non-exclusive logical "or", i.e., at least one of the motor-generator 38 or the auxiliary electric system 56. Therefore, in certain embodiments, the second energy storage device 42 is in electrical communication with the motor-generator 38 or the auxiliary electric system 56. In other embodiments, the second energy storage device 42 is in electrical communication with both of the motor-generator 38 and the auxiliary electric system 56.

Generally, the second switching device 68 is used to selectively block the flow of current to the second energy storage device 42. When the second switching device 68 is in the second closed state, the electrical circuit to the second energy storage device 42 is completed or closed and current can flow to or from the second energy storage device 42. When the second switching device 68 is in the second open state, the electrical circuit is separated or open and current cannot flow to or from the second energy storage device 42. The second open state is shown in solid lines in FIGS. 2 and 4 and the second closed state is shown as dashed lines in FIGS. 2 and 4.

The second switching device 68 can be a unidirectional blocking switch or a bidirectional blocking switch. In one configuration, the second switching device 68 is a solid-state switch. The second switching device 68 can be a binary switch, a contact switch, a relay switch, etc. The second switching device 68 is schematically illustrated in these Figures for illustrative purposes only and should not be construed as any particular switch.

The powertrain 12A, 12B, 12C, 12D of each of the embodiments includes a third switching device 64 disposed downstream from the motor-generator 38, and the first energy storage device 40, along the electrical bus 63, and upstream from the second energy storage device 42 and the auxiliary electric system 56, along the electrical bus 63. As used herein the term "downstream" is the direction of current flowing from the motor-generator 38 toward the auxiliary electric system 56 along the electrical bus 63. As used herein, the term "upstream" is the direction opposite downstream, and is generally described as the direction of current flowing from the auxiliary electric system 56 toward the motor-generator 38 along the electrical bus 63. The arrow 66, in each of the Figures, points in the downstream direction. It should be appreciated that the upstream direction is opposite of arrow 66. Generally, the third switching device 64 is disposed in a series electrical relationship, i.e., a series circuit arrangement, with the motor-generator 38 and the auxiliary electric system 56. The third switching device can be a binary switch, a contact switch, a relay switch, etc.

In the embodiments 12A, 12B of FIGS. 1 and 2, the motor-generator 38 can include a motor/generator clutch 70 selectively disconnecting rotation between the motor/generator pulley 48 and the motor/generator shaft 44. While the embodiments of the powertrain 12C, 12D do not show the motor-generator 38 including the motor/generator clutch 70, it should be appreciated that the motor-generator 38 of the embodiments of the powertrain 12C, 12D may also include the motor/generator clutch 70. The motor/generator pulley 48 is coupleable to the motor/generator shaft 44 through the selective operation of the motor/generator clutch 70. Therefore, the motor/generator pulley 48 is selectively coupled to the motor/generator shaft 44 through the operation of the motor/generator clutch 70. The motor/generator clutch 70 can be disposed adjacent to the motor/generator pulley 48 or adjacent to the first end 50 of the motor-generator 38. Actuation of the motor/generator clutch 70 allows various operations of the motor-generator 38 without transferring rotation between the crankshaft pulley 34 and the motor/generator pulley 48 by the endless rotatable device 58. The motor/generator clutch 70 can include a solenoid 72 to selectively actuate the motor/generator clutch 70. It is to be appreciated that the motor/generator clutch 70 can be any suitable type of clutch.

Turning to the embodiments of the powertrain 12A, 12B shown in FIGS. 1 and 2, the motor-generator 38 and the starter mechanism 60 are selectively geared to each other to start the engine 14. Specifically, the motor-generator 38 and the starter mechanism 60 are selectively geared to each other to transfer torque from the motor-generator 38 through the starter mechanism 60 to the crankshaft 22 to start the engine 14. The motor-generator 38 and the starter mechanism 60 can be geared to each other in various configurations, and FIGS. 1 and 2 are an example of one suitable configuration. In this embodiment, the starter mechanism 60 can include the first starter gear 76 selectively engaging the ring gear 30 to selectively rotate the ring gear 30 and the crankshaft 22 to start the engine 14. Specifically, the starter mechanism 60 does not include a separate motor to rotate the first starter gear 76. Instead, rotation of the first starter gear 76 is provided by the motor-generator 38 to start the engine 14. In other words, the motor-generator 38 can be operated as a motor to turn the first starter gear 76 to start the engine 14. Therefore, for all starts of the engine 14 (for the embodiments 12A, 12B of FIGS. 1 and 2), whether a short period of time (such as when the engine 14 has been shut off at a stop light, etc.) or an extended period of time (such as when the engine 14 has been shut off overnight, etc.), the motor-generator 38 operates to rotate the first starter gear 76 to start the engine 14.

Continuing with the embodiments of the powertrain 12A, 12B of FIGS. 1 and 2, the motor-generator 38 can include a motor/generator gear 78 attached to a distal end of the motor/generator shaft 44 such that the motor/generator gear 78 and the motor/generator shaft 44 are rotatable in unison about the first axis 46. Generally, the motor/generator gear 78 can be disposed outside of the second end 52 of the motor-generator 38. As discussed above, the motor/generator pulley 48 can be disposed outside of the first end 50 of the motor-generator 38. Therefore, the motor/generator pulley 48 is disposed adjacent to one end of the motor-generator 38 and the motor/generator gear 78 is disposed adjacent to another end of the motor-generator 38. For example, the motor/generator pulley 48 and the motor/generator gear 78 can be spaced from each other at opposite ends of the motor-generator 38.

Furthermore, in the embodiments 12A, 12B of FIGS. 1 and 2, the starter mechanism 60 can include a second starter gear 80 coupleable to the motor/generator gear 78 such that the starter mechanism 60 and the motor-generator 38 are selectively geared to each other to transfer torque from the motor/generator shaft 44 through the first starter gear 76. The second starter gear 80 can move back and forth to selectively engage the motor/generator gear 78 to selectively transfer rotation from the motor/generator shaft 44 to the starter mechanism 60. Similarly, the first starter gear 76 can move back and forth to selectively engage the ring gear 30 to selectively transfer rotation from the motor/generator shaft 44 to the first starter gear 76.

Additionally, the starter mechanism 60, of FIGS. 1 and 2, can include a first shaft 82 having the first starter gear 76 attached thereto. In this embodiment, the first shaft 82 and the first starter gear 76 are rotatable in unison about a second axis 84. Generally, the first and second axes 46, 84 can be spaced and substantially parallel to each other. In addition, in this embodiment, the first shaft 82 and the first starter gear 76 move along the second axis 84 in unison. In other words, the first shaft 82 and the first starter gear 76 are rotatable about and movable along the second axis 84 as a unit. In this embodiment, the motor/generator shaft 44 and the first shaft 82 are offset from each other. It is to be appreciated that one or more bearings can rotatably support the first shaft 82.

Continuing with the embodiments 12A, 12B of FIGS. 1 and 2, the starter mechanism 60 can also include a second shaft 86 having the second starter gear 80 attached thereto. In this embodiment, the second shaft 86 and the second starter gear 80 are rotatable in unison about the second axis 84. Additionally, in this embodiment, the second shaft 86 and the second starter gear 80 are movable along the second axis 84 in unison. In other words, the second shaft 86 and the second starter gear 80 can rotate about and move along the second axis 84 as a unit. The first and second starter gears 76, 80 can move along the second axis 84 in opposite directions, and thus, the first and second shafts 82, 86 can correspondingly move in opposite directions.

The first shaft 82 extends outwardly from a first end 88 of the starter mechanism 60 and the second shaft 86 extends outwardly from a second end 90 of the starter mechanism 60. Specifically, the starter mechanism 60 can include a housing having the first and second ends 88, 90. Therefore, the first starter gear 76 can be disposed outside the first end 88 of the starter mechanism 60 and the second starter gear 80 can be disposed outside the second end 90 of the starter mechanism 60. Simply stated, the first starter gear 76 is disposed adjacent to one end of the starter mechanism 60 and the second starter gear 80 is disposed adjacent to another end of the starter mechanism 60. For example, the first and second starter gears 76, 80 can be spaced from each other at opposite ends of the starter mechanism 60.

When the motor-generator 38 is actuated to start the engine 14, the first and second starter gears 76, 80 move into engagement with the ring gear 30 and the motor/generator gear 78 respectively, which thus provides concurrent rotation of the first and second shafts 82, 86, the first and second starter gears 76, 80, the motor/generator shaft 44 and the motor/generator gear 78 to rotate the ring gear 30 and the crankshaft 22 to start the engine 14. When the first starter gear 76 engages the ring gear 30 and the second starter gear 80 engages the motor/generator gear 78 torque is transferred from the motor/generator shaft 44 through the first and second starter gears 76, 80, and corresponding shafts 82, 86, and the ring gear 30 to the crankshaft 22 to start the engine 14. In this embodiment, the motor/generator shaft 44 and the second shaft 86 are offset from each other, while the first and second shafts 82, 86 are spaced from each other along the second axis 84. In other words, the first and second shafts 82, 86 can be concentric along the second axis 84.

The starter mechanism 60 can also include an intermediate shaft coupled to the first and second shafts 82, 86 between the first and second starter gears 76, 80 such that the intermediate shaft can rotatably couple the first and second shafts 82, 86 together. In other words, the first and second shafts 82, 86 remain in engagement with the intermediate shaft when the first and second shafts 82, 86 move back and forth along the second axis 84. The intermediate shaft can be any suitable configuration to allow the first and second shafts 82, 86 to move along the second axis 84 while also rotatably coupling the first and second shafts 82, 86 together. For example, the first and second shafts 82, 86 can move along the second axis 84 inside the intermediate shaft, and the intermediate shaft and the first and second shafts 82, 86 can be splined or be any other suitable configuration to cooperate with each other. It is to be appreciated that one or more bearings can rotatably support the second shaft 86 and/or the intermediate shaft. The first starter gear 76 can be coupleable to the motor/generator shaft 44 through engagement of various shafts and/or selective engagement of gears discussed above.

In certain embodiments, the first and second starter gears 76, 80 can move in tandem. Therefore, for example, the first starter gear 76 can move into engagement with the ring gear 30 before the second starter gear 80 moves into engagement with the motor/generator gear 78, and alternatively, the second starter gear 80 can move into engagement with the motor/generator gear 78 before the first starter gear 76 moves into engagement with the ring gear 30. In other embodiments, the first and second starter gears 76, 80 can move simultaneously into engagement with the ring gear 30 and the motor/generator gear 78 respectively.

Continuing with the embodiments 12A, 12B of FIGS. 1 and 2, the starter mechanism 60 can also include at least one linear actuator 92. For the embodiments 12A, 12B of FIGS. 1 and 2, a plurality of linear actuators 92A, 92B are utilized. The linear actuator 92A can be selectively energized to move the first starter gear 76 along the second axis 84, whereas the linear actuator 92B can be selectively energized to move the second starter gear 80 along the second axis 84. The linear actuators 92A, 92B can be various configurations, and non-limiting examples can include a solenoid, an electric motor driving a ball-screw mechanism, a shape-memory alloy actuator, an electro-active polymer actuator, etc. For the shape-memory alloy actuator, selectively energizing the material, such as the alloy, can change the shape of the material which causes the first starter gear 76 or the second starter gear 80 to move along the second axis 84. For the electro-active polymer actuator, selectively energizing the material, such as the polymer, can change the shape of the material to move the first starter gear 76 or the second starter gear 80 along the second axis 84.

The operation of the linear actuator 92A is detailed below utilizing the solenoid example. Generally, the solenoid can be utilized to move the first starter gear 76 along the second axis 84. The solenoid can be disposed inside, outside or partially outside of the starter mechanism 60, or can be in any other suitable location. For FIG. 1, one solenoid (e.g., linear actuator 92A) can be utilized to selectively move the first shaft 82 and the first starter gear 76, and another solenoid (e.g., linear actuator 92B) can be utilized to selectively move the second shaft 86 and the second starter gear 80.

The solenoid can include a coil selectively magnetized and a core attracted to the coil when the coil is magnetized. When the core is coupled to the first starter gear 76, the core is selectively attracted to the coil. When the core is attracted to the coil, the first starter gear 76 can move into engagement with the ring gear 30. Therefore, the coil remains stationary while the core is selectively movable. It is to be appreciated that the solenoid can be other configurations than discussed above. For example, the coil can be concentric or eccentric about the second axis 84, or the coil can be disposed at one side. The core can be formed of a ferromagnetic material or any other suitable material that can be attracted to the coil when the coil is magnetized.

Furthermore, for the solenoid configuration of the linear actuators 92A, 92B, the starter mechanism 60 can include at least one return mechanism. For example, with reference to the linear actuator 92A, the return mechanism may move the first starter gear 76 back along the second axis 84. For example, when the solenoid is energized, the first starter gear 76 can move to engage the ring gear 30, and when the solenoid is de-energized, the return mechanism can move the first starter gear 76 out of engagement with the ring gear 30.

The return mechanism can include a biasing member to bias the first starter gear 76 back along the second axis 84. The biasing member can be a coil spring or any other suitable biasing member to move the first starter gear 76. It is to be appreciated that one or more shoulders can be coupled to the first starter gear 76 and the inside of the starter mechanism 60 to provide reaction surfaces for the biasing member to move the first starter gear 76 back along the second axis 84. It is to also be appreciated that the return mechanism can alternatively be electronically actuated.

Turning to the embodiments of the powertrain 12C, 12D of FIGS. 3 and 4, the starter mechanism 60 operates independently of the motor-generator 38 to selectively start the engine 14. In other words, the motor-generator 38 does not assist the starter mechanism 60 to start the engine 14, and thus, the starter mechanism 60 can exclusively start the engine 14. In other words, the starter mechanism 60 does not utilize the motor-generator 38 as the motor to rotate the first starter gear 76. Generally, the motor/generator clutch 70 may be eliminated in this embodiment. The starter mechanism 60 starts the engine 14 when the engine 14 has been shut off for an extended period of time (such as overnight) or been shut off for a short period of time (such as shut off at a stop light, etc.). The motor-generator 38 is coupled to the engine 14 through the endless rotatable device 58 and not through the starter mechanism 60 as other embodiments.

For embodiments of the powertrain 12C, 12D of FIGS. 3 and 4, if the motor-generator 38 has sufficient torque output and sufficient mechanical advantage through the endless rotatable device 58, then the motor-generator 38 can start, or assist in starting, the engine 14, such as restarts at a stop light. Therefore, generally, in the embodiment of the powertrain 12C, 12D of FIGS. 3 and 4, the motor-generator 38 operates as a torque assist or as a generator. When the motor-generator 38 is in the torque assist mode, the motor-generator 38 can operate as a motor to provide additional torque to the wheels 20. Furthermore, the motor-generator 38 can operate as a generator in the generating mode or the regenerative braking mode.

Continuing with embodiments of the powertrain 12C, 12D of FIGS. 3 and 4, the starter mechanism 60 can include a motor 94 and the first starter gear 76 engagable with the ring gear 30 to selectively rotate the ring gear 30 to transfer toque to the crankshaft 22. The first starter gear 76 is coupled to the motor 94 of the starter mechanism 60 such that the motor 94 selectively rotates the first starter gear 76. Therefore, the starter mechanism 60 operates independently of the motor-generator 38.

The starter mechanism 60 can include a linear actuator 92A to move the first starter gear 76 along the second axis 84 into and out of engagement with the ring gear 30. Therefore, the starter mechanism 60 is coupled to the engine 14 when the first starter gear 76 engages the ring gear 30. The linear actuator 92A can be various configurations, and non-limiting examples can include a solenoid, an electric motor driving a ball-screw mechanism, a shape-memory alloy actuator, an electro-active polymer actuator, etc. For the shape-memory alloy actuator, selectively energizing the material, such as the alloy, can change the shape of the material which causes the first starter gear 76 to move along the second axis 84. For the electro-active polymer actuator, selectively energizing the material, such as the polymer, can change the shape of the material to move the first starter gear 76 along the second axis 84. The starter mechanism 60 may further include a rotational actuator 92B that is operable to engage rotation of the first starter gear 76 about the second axis 84. The rotational actuator 92B may include, for example, a switch or solenoid.

The powertrain 12A, 12B, 12C, 12D of each of the embodiments of FIGS. 1-4 can further include a controller 96, which can be part of an electronic control module that is in communication with various components of the vehicle 10. Generally, the controller 96 signals various components of the vehicle 10 to selectively operate, some of which are discussed below. It is to be appreciated that more than one controller 96 can be utilized.

The controller 96 includes a processor 98 and a memory 100 on which is recorded instructions for communicating with the motor-generator 38, the starter mechanism 60, the first and/or second energy storage devices 40, 42, the first, second, or third, switching devices 62, 64, 68. The controller 96 is configured to execute the instructions from the memory 100, via the processor 98. For example, the controller 96 can be a host machine or distributed system, e.g., a computer such as a digital computer or microcomputer, acting as a vehicle control module, and/or as a proportional-integral-derivative (PID) controller device having a processor, and, as the memory 100, tangible, non-transitory computer-readable memory such as read-only memory (ROM) or flash memory. The controller 96 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 96 can include all software, hardware, memory 100, algorithms, connections, sensors, etc., necessary to monitor and control the motor-generator 38, the starter mechanism 60, the first, second, or third switching devices 62, 64, 68. Furthermore, the controller 96 can include all software, hardware, memory 100, algorithms, connections, sensors, etc., necessary to monitor the first and/or second energy storage devices 40, 42. As such, a control method can be embodied as software or firmware associated with the controller 96. It is to be appreciated that the controller 96 can also include any device capable of analyzing data from various sensors, comparing data, making the necessary decisions required to control and monitor the motor-generator 38, the starter mechanism 60, the first, second, or third switching devices 62, 64, 68 as well as monitor the first and/or second energy storage devices 40, 42.

For the powertrain 12A, 12B, 12C, 12D of each of the embodiments of FIGS. 1-4, the controller 96 is in communication with the motor-generator 38, the starter mechanism 60, the first switching device 62, the second switching device 68, and the third switching device 64 to selectively operate the motor-generator 38, the starter mechanism 60, the first switching device 62, the second switching device 68, and the third switching device 64. For all of these embodiments, the controller 96 selectively signals the different switching devices 62, 64, 68 to establish one of either an open state or a closed state. Additionally, the controller 96 may signal actuators of the starter mechanism 60 (e.g., 92A, 92B), and/or the motor/generator clutch 70 to establish either an actuated position or an un-actuated position, to achieve the desired operation, such as a generating mode, a torque assist mode, a regenerative braking mode, a cold-engine start mode, an auto-engine start mode, etc.

Furthermore, the controller 96 can be in communication with the first energy storage device 40. When the first switching device 62 is in the first closed state, current can flow into the first energy storage device 40 or flow out of the first energy storage device 40, and the controller 96 can monitor the amount of current in the first energy storage device 40. Additionally, the controller 96 can be in communication with the integrated power inverter 54.

The controller 96 is also in communication with the second energy storage device 42, and with the second switching device 68 to selectively signal the second switching device 68 to establish one of the second open state and the second closed state. Therefore, depending on the desired operation, the controller 96 signals the second switching device 68 to be in one of the second open state and the second closed state. When the second switching device 68 is in the second closed state, current can flow into the second energy storage device 42 or flow out of the second energy storage device 42, and the controller 96 can monitor the amount of current in the second energy storage device 42.

The controller 96 of the powertrain 12A, 12B, 12C, 12D of each of the embodiments of FIGS. 1-4 receives current from the first energy storage device 40. Specifically, the controller 96 remains in electrical communication with the first energy storage device 40 independently of which state the first switching device 62 is in. In other words, the electrical connection to the controller 96 is disposed between the first energy storage device 40 and the first switching device 62 such that current can continuously flow to the controller 96 without being affected by the state that the first switching device 62 is in.

Additionally, the architecture of the powertrain 12B, 12D of FIGS. 2 and 2, described above, allows for the second energy storage device 42 to charge the first energy storage device 40. For example, if the state of charge of the first energy storage device 40 is below a threshold value required to start the engine 14, and if the temperature of the second energy storage device 42 is below a pre-defined value that would render the second energy storage device 42 unable to provide sufficient power to start the engine 14, the first switching device 62, the second switching device 68, and the third switching device 64 may be positioned into the first closed state, the second closed state, and the third closed state respectively, for a period of time, to allow the second energy storage device 42 time to trickle charge the first energy storage device 40. Once the first energy storage device 40 is charged to a state of charge sufficient to provide power to start the engine 14, the controller 96 may position the switching devices into their appropriate position for the selected starting mode.

The different operating modes and the position of the first switching device 62, the second switching device 68, and the third switching device 64 are shown below. Additionally, the tables show the position of a first actuator and a second actuator of the starter mechanism for operating the starter mechanism, and a position of the motor/generator clutch 70. The first actuator and the second actuator may include, for example, the linear actuators 92A, and 92B shown in FIGS. 1 and 3 and described above with reference to their respective embodiment. Within the tables below, the first switching device 62 is represented by the column labeled S1, the second switching device 68 is represented by the column labeled S2, the first actuator is represented by the column labeled A1, the second actuator is represented by the column labeled A2, and the motor/generator clutch 70 is represented by the column labeled A3. Within the tables below, a "0" denotes an open state in which electrical communication is disconnected and/or the actuator is not engaged, and a "1" denotes a closed state in which electrical communication is connected and/or the actuator is engaged.

The conditions and/or requirements of the powertrain 12A, 12B, 12C, 12D necessary to enter/exit the specific control modes shown in the tables below are provided in the column labeled "Conditions to Enter/Exit". If the controller 96 determines that these conditions are satisfied, the controller 96 may signal the various switching devices and actuators into their respective positions as indicted in the table below.

| Mode | A1 | A2 | A3 | S1 | S2 | Conditions to Enter/Exit |
|---|---|---|---|---|---|---|
| Engine_Off | 1 | 1 | 0 | 0 | 0 | Vehicle Off |
| Engine_Idle_Off_1 | 1 | 1 | 0 | 1 | 0 | SOC1 > ESS1_Max_Limit |
| Engine_Idle_Off_2 | 1 | 1 | 0 | 0 | 1 | SOC1 < ESS1_Min_Limit |
| Key_Start_1 | 1 | 1 | 0 | 0 | 1 | Temp < Threshold_Start_Temp |
| Key_Start_2 | 1 | 1 | 0 | 1 | 0 | Temp > Threshold_Start_Temp |
| Auto_Start | 1 | 1 | 0 | 1 | 0 | SOC1 > ESS1_Max_Limit |
| Torque_Assist | 0 | 0 | 1 | 1 | 0 | SOC1 > ESS1_Max_Limit |
| Regen_1 | 0 | 0 | 1 | 1 | 0 | SOC1 < ESS1_Min_Limit |
| Regen_2 | 0 | 0 | 1 | 1 | 1 | SOC1 < ESS1_Min_Limit, and SOC2 < ESS2_Min_Limit |
| Regen_3 | 0 | 0 | 1 | 1 | 1 | SOC1 < ESS1_Max_Limit and SOC2 < ESS2_Max_Limit |
| Auto_Stop_1 | 0 | 0 | 0 | 1 | 0 | SOC1 > ESS1_Min_Limit |
| Auto_Stop_2 | 0 | 0 | 0 | 0 | 1 | SOC2 > ESS2_Max_Limit |
| Auto_Stop_3 | 0 | 0 | 0 | 0 | 1 | SOC1 < ESS1_Min_Limit and SOC2 > ESS2_Min_Limit |
| Exit_Auto_Stop | 0 | 0 | 1 | 1 | 1 | SOC1 < ESS1_Min_Limit and SOC2 < ESS2_Min_Limit |
| I-Sailing_1 | 0 | 0 | 1 | 1 | 0 | SOC1 > ESS1_Min_Limit |
| I-Sailing_2 | 0 | 0 | 1 | 0 | 1 | SOC1 < ESS1_Min_Limit |
| Exit_I-Sailing | 0 | 0 | 1 | 1 | 1 | SOC1 < ESS1_Min_Limit and SOC2 < ESS2_Min_Limit |
| Sailing_Fault_Tol_1 | 1 | 1 | 0 | 1 | 0 | S2 Failed |
| Sailing_Fault_Tol_2 | 1 | 1 | 0 | 0 | 1 | S1 Failed |

-continued

| Mode | A1 | A2 | A3 | S1 | S2 | Conditions to Enter/Exit |
|---|---|---|---|---|---|---|
| Recharge | 0 | 0 | 1 | 1 | 1 | SOC1 < ESS1_Min_Limit and SOC2 < ESS2_Min_Limit |
| Change-of-Mind_Gear | 1 | 1 | 0 | 1 | 0 | Restart with Starter Mech. |
| Change-of-Mind_Belt | 0 | 0 | 1 | 1 | 0 | Restart with Belt |

Within the above table, the following terms noted in the "Conditions to Enter/Exit" column of the respective tables are defined as follows below.

SOC1=the existing state of charge of the first energy storage device 40.

SOC2=the existing state of charge of the second energy storage device 42.

ESS1_Max_Limit=maximum state of charge limit for the first energy storage device 40.

ESS1_Min_Limit=minimum state of charge limit for the first energy storage device 40.

ESS2_Max_Limit=maximum state of charge limit for the second energy storage device 42.

ESS2_Min_Limit=minimum state of charge limit for the second energy storage device 42.

Temp=Ambient temperature.

Threshold Start Temp=predefined temperature value

S2_Failed=Internal condition and/or fault in the second switching device 68 that renders the second switching device 68 unavailable.

S1_Failed=Internal condition and/or fault in the first switching device 62 that renders the first switching device 62 unavailable.

Restart through starter mechanism=After an auto-stop event, restarting the engine 14 through the starter mechanism 60. This is achieved by engaging the first solenoid A1 and the second solenoid A2. In systems employing a separate starter unit (separate motor from the motor-generator 38) the engine 14 is started by the starter motor and the first and second solenoids A1, A2 are duel tandem solenoids in the starter motor. In systems employing only the motor-generator 38 (coupled to the crankshaft 22 via the starter mechanism 60), the engine 14 is started by the motor-generator 38, and the first and second solenoids A1, A2 are part of the starter mechanism 60.

Restart through belt=After an auto-stop event, restarting the engine 14 through the endless rotatable device 58, by engaging the motor/generator clutch 70.

Figure 5:
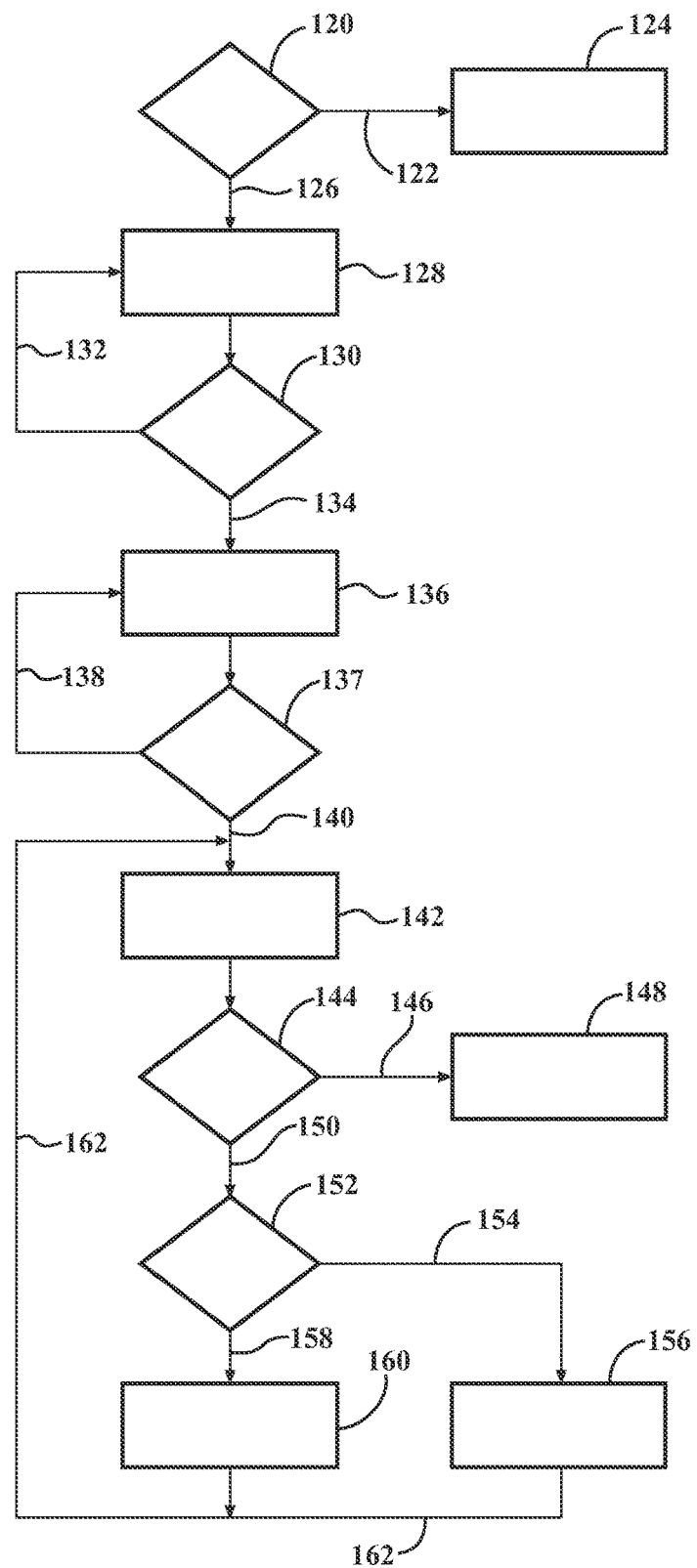
FIG. 5 is a flowchart representing a method of controlling a powertrain for a vehicle.

Referring to FIG. 5, a method of controlling the powertrain 12A, 12B, 12C, 12D is generally shown. Beginning at box 120, the vehicle controller 96 determines if the vehicle key is disposed in an accessory on position, or is disposed in an off position. If the key is disposed in the off position, generally indicated at 122, then the vehicle controller 96 takes no further action, generally indicated by box 124, and the first energy storage device 40 and/or the second energy storage device 42 remain electrically disconnected from the auxiliary electric system 56. If the key is disposed in the accessory on position, generally indicated at 126, then the vehicle controller 96 configures the powertrain 12A, 12B, 12C, 12D for an accessory on control mode, generally indicated by box 128. When in the accessory on control mode, the vehicle controller 96 positions the first actuator 92A, the second actuator 92B, and the third actuator 70 into their respective open or disengaged states, positions the first switching device 62 and the third switching device 64 in the first open state and the third open state respectively, and positions the second switching device 68 in the second closed state.

If the vehicle controller 96 determines that the key is disposed in the accessory on position, then the vehicle controller 96 continues to determine if the key has been moved to an engine crank position, generally indicated by box 130. If the vehicle controller 96 determines that the key has not been moved to the engine crank position, generally indicated at 132 and that the key remains in the accessory on position, then the vehicle controller 96 maintains the configuration of the powertrain in the accessory on control mode, generally indicated by box 128. If the vehicle controller 96 determines that the key has been moved to the engine crank position, generally indicated at 134, then the vehicle controller configures the powertrain 12A, 12B, 12C, 12D for a cold crank control mode, generally indicated by box 136. When in the cold crank control mode, the vehicle controller 96 positions the first actuator 92A, the second actuator 92B of the starter mechanism 60 in their respective engaged states, positions the third actuator 70 (e.g., the motor/generator clutch 70 if so equipped) into its disengaged state, positions the first switching device 62 in the first open state, and positions the second switching device 68 and the third switching device 64 in the second closed state and the third closed state respectively.

The vehicle controller 96 then continues to monitor the speed of the engine to determine if the engine has started running, generally indicated by box 137. If the speed of the engine is not greater than a threshold engine speed, generally indicated at 138, then the vehicle controller maintains the configuration of the powertrain 12B, 12C, 12D in the cold crank control mode, generally indicated by box 136. If the speed of the engine is greater than the threshold engine speed, generally indicated at 140, then the vehicle controller 96 may determine that the engine has started running, and may begin to sense a plurality of different operating conditions of the vehicle, generally indicated by box 142. The different operating conditions of the vehicle may include, but are not limited to, a throttle position, a brake fluid pressure at each brake caliper of the vehicle, an engine speed, a vehicle speed, a gear/transmission state, a state of charge of the first energy storage device 40 and/or the second energy storage device 42, etc.

The vehicle controller 96 monitors a position of the transmission 16 to determine a current operating mode of the transmission 16, generally indicated by box 144. The vehicle controller 96 monitors the operating mode of the transmission 16 to determine if the current operating mode is one of either a forward drive mode, or a reverse drive mode, or is not one of the forward drive mode or the reverse drive mode. If the vehicle controller 96 determines that the current operating mode of the transmission 16 is one of the forward drive mode or the reverse drive mode, generally indicated at 146, then the vehicle controller 96 continues to select a desired control mode from a plurality of different control modes to configure the powertrain 12A, 12B, 12C, 12D into, generally indicated at box 148. The process of selecting which of the available control modes to configure the powertrain 12A, 12B, 12C, 12D into, generally indicated by box 148, is generally represented in FIG. 6, and described in detail below.

If the vehicle controller 96 determines that the current operating mode of the transmission 16 is not one of the forward drive mode or the reverse drive mode, generally indicated at 150, then the vehicle controller 96 proceeds to determine if the vehicle 10 is currently executing an autostop, generally indicated by box 152. As used herein, the term "autostop" is defined as a condition in which the vehicle is not moving, and fueling to the engine has been automatically stopped by the vehicle controller to stop the engine from running, while the key remains in a run position. Accordingly, an autostop is automatically initiated by the vehicle controller to stop the engine, and is not initiated by an operator of the vehicle.

Figure 7:
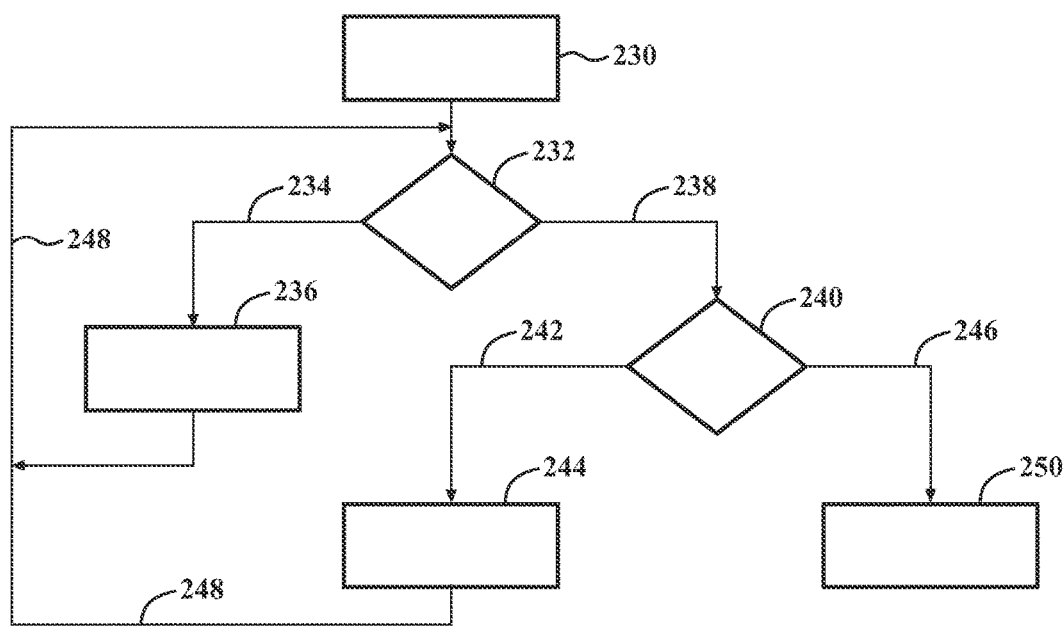
FIG. 7 is a flowchart representing a method of implementing an autostop control mode as the desired control mode.
Figure 8:
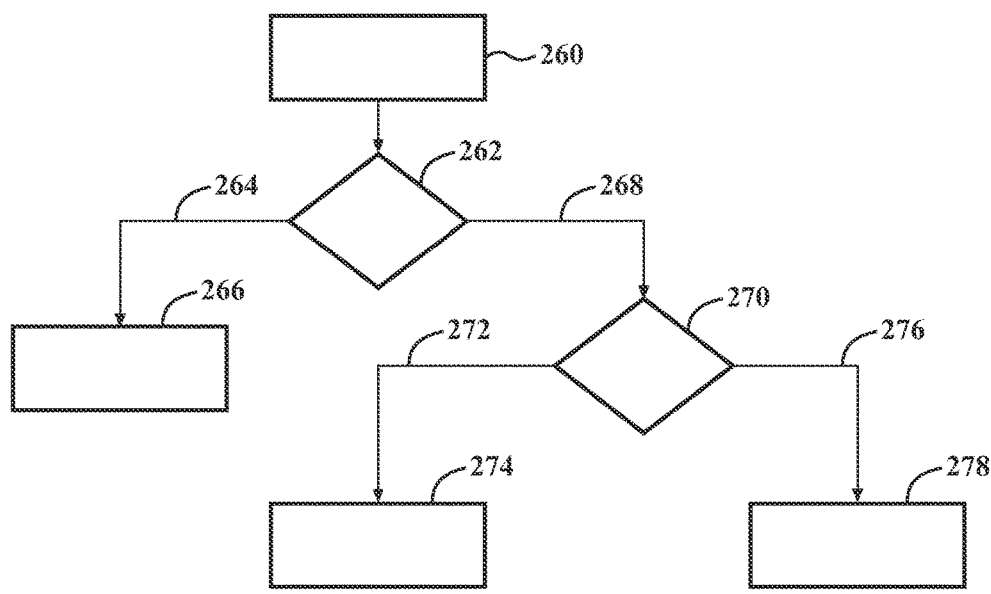
FIG. 8 is a flowchart representing a method of implementing a discharge control mode as the desired control mode.

If the vehicle controller 96 determines that the vehicle is currently executing an autostop, generally indicated at 154, then the vehicle controller 96 signals to configure the powertrain 12A, 12B, 12C, 12D for an autostop control mode, generally indicated by box 156. The process of configuring the powertrain 12A, 12B, 12C, 12D for the autostop control mode, generally indicated by box 156, is generally represented in FIG. 7, and described in detail below. If the vehicle controller 96 determines that the vehicle is not currently executing an autostop, generally indicated at 158, and that the current operating mode of the transmission 16 is not one of the forward drive mode or the reverse drive mode, then the vehicle controller 96 signals to configure the powertrain 12A, 12B, 12C, 12D for a discharge control mode, generally indicated by box 160. The process of configuring the powertrain 12A, 12B, 12C, 12D for the discharge control mode, generally indicated by box 160, is generally represented in FIG. 8, and described in detail below. The vehicle controller 96 continues to monitor the different operating conditions of the vehicle, generally indicated at 162, in order to determine which of the different control modes to select and/or reconfigure the powertrain 12A, 12B, 12C, 12D into.

Figure 6:
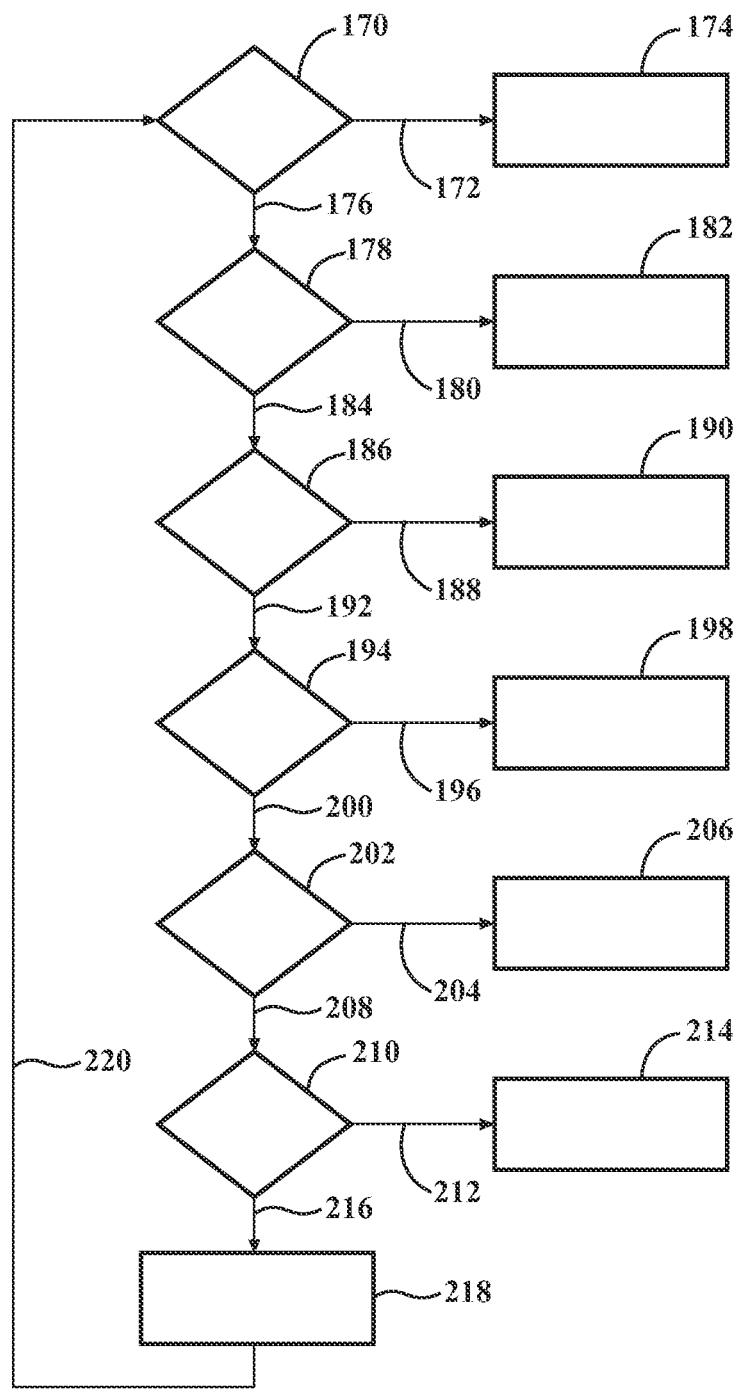
FIG. 6 is a flowchart representing a method of selecting a desired control mode from a plurality of available control modes for the powertrain of the vehicle.
Figure 9:
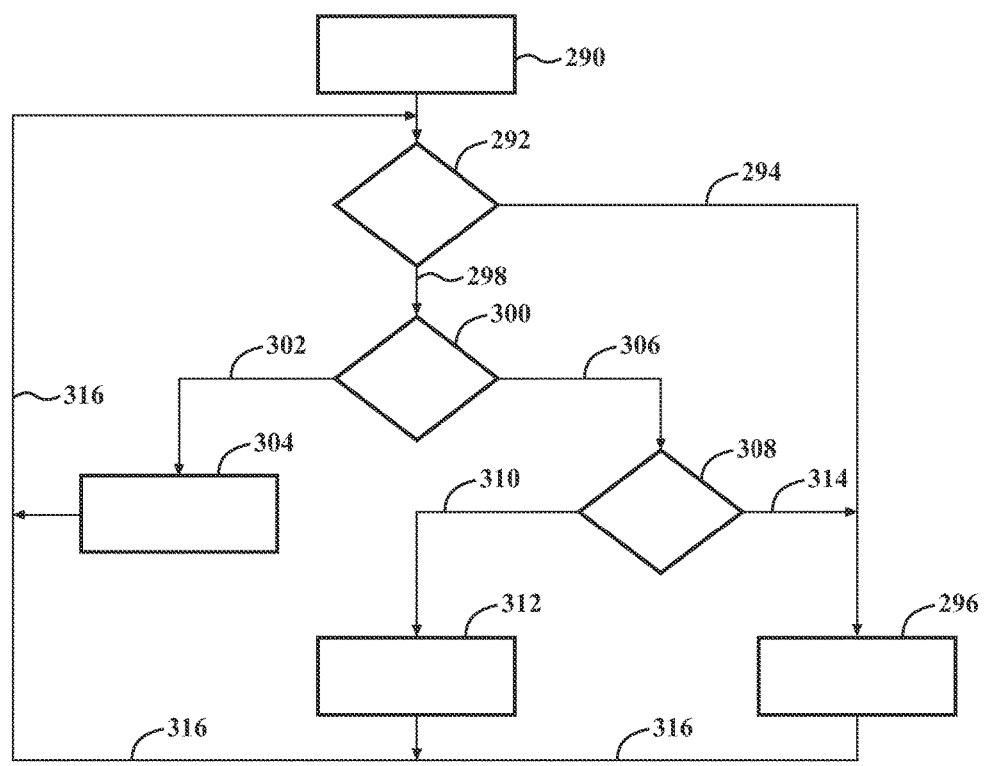
FIG. 9 is a flowchart representing a method of implementing an acceleration control mode as the desired control mode.

Referring to FIG. 6, the process that the vehicle controller 96 follows for selecting the desired control mode, from the available control modes, to configure the powertrain 12A, 12B, 12C, 12D into, is generally shown. The process begins with the vehicle controller 96 determining if the vehicle is accelerating, generally indicated by box 170. If the vehicle controller 96 determines that the vehicle is accelerating, generally indicated at 172, then the vehicle controller 96 signals to configure the powertrain 12A, 12B, 12C, 12D for an acceleration control mode, generally indicated by box 174. The process of configuring the powertrain 12A, 12B, 12C, 12D for the acceleration control mode, generally indicated by box 174, is generally represented in FIG. 9, and described in detail below.

Figure 10:
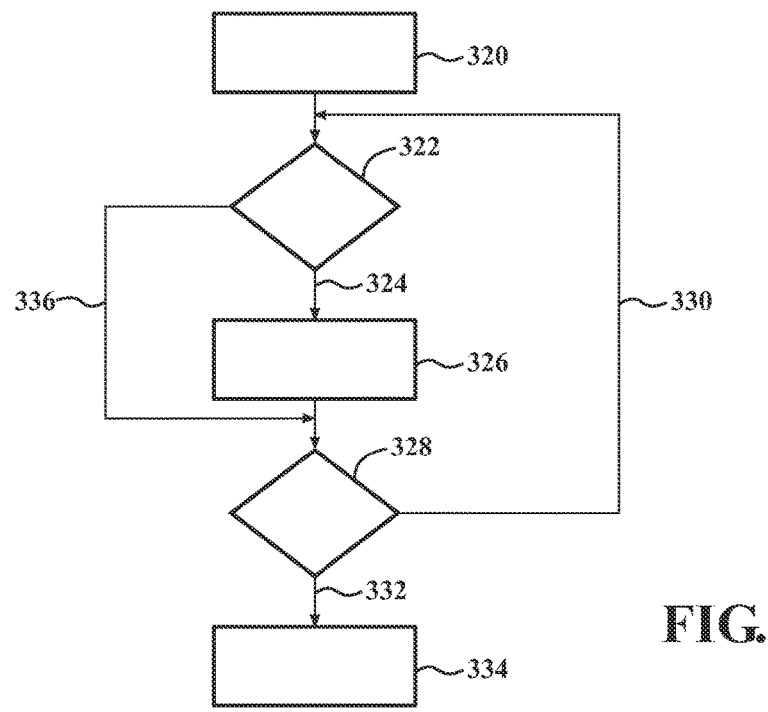
FIG. 10 is a flowchart representing a method of implementing a deceleration control mode as the desired control mode.

If the vehicle controller 96 determines that the vehicle 10 is not accelerating, generally indicated at 176, then the vehicle controller continues to determine if the vehicle is decelerating, generally indicated by box 178. If the vehicle controller 96 determines that the vehicle is decelerating, generally indicated at 180, then the vehicle controller 96 signals to configure the powertrain 12A, 12B, 12C, 12D for a deceleration control mode, generally indicated by box 182. The process of configuring the powertrain 12A, 12B, 12C, 12D for the deceleration control mode, generally indicated by box 182, is generally represented in FIG. 10, and described in detail below.

If the vehicle controller 96 determines that the vehicle 10 is not decelerating, generally indicated at 184, then the vehicle controller continues to determine if the vehicle is executing an autostop, generally indicated by box 186. If the vehicle controller 96 determines that the vehicle is currently executing an autostop, generally indicated at 188, then the vehicle controller 96 signals to configure the powertrain 12A, 12B, 12C, 12D for the autostop control mode, generally indicated by box 190. The process of configuring the powertrain 12A, 12B, 12C, 12D for the autostop control mode, generally indicated by box 190, is generally represented in FIG. 7, and described in detail below.

Figure 12:
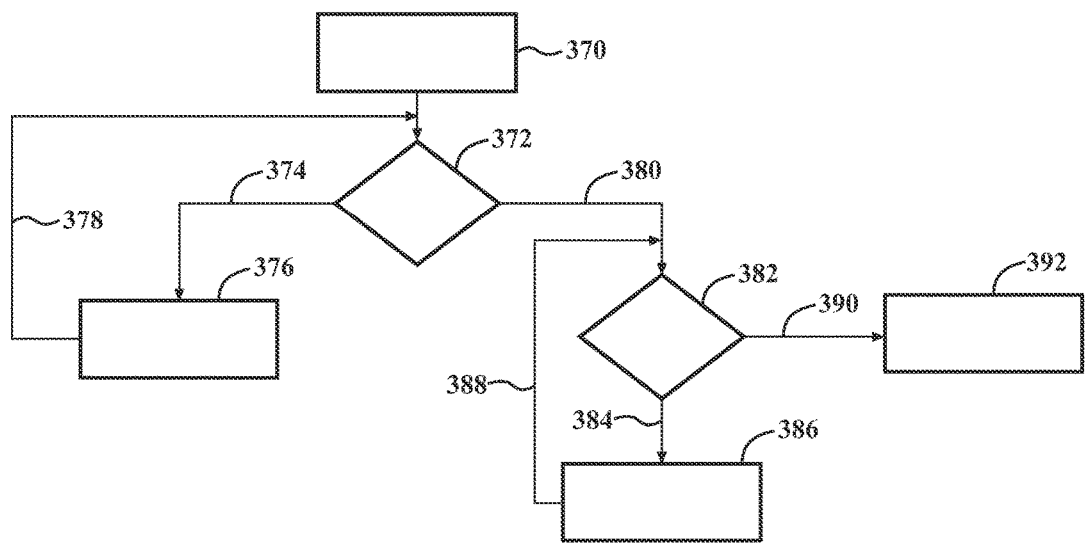
FIG. 12 is a flowchart representing a method of implementing an idlestop control mode as the desired control mode.

If the vehicle controller 96 determines that the vehicle 10 is not currently executing an autostop, generally indicated at 192, then the vehicle controller 96 continues to determine if the vehicle is executing an idlestop, generally indicated by box 194. As used herein, the term "idlestop" is defined as a condition in which the vehicle is not moving, and fueling to the engine has not been automatically stopped by the vehicle controller to stop the engine from running, while the key remains in a run position. Accordingly, the vehicle 10 is stopped and the engine is running, i.e., idling. If the vehicle controller 96 determines that the vehicle is currently executing an idlestop, generally indicated at 196, then the vehicle controller 96 signals to configure the powertrain 12A, 12B, 12C, 12D for an idlestop control mode, generally indicated by box 198. The process of configuring the powertrain 12A, 12B, 12C, 12D for the idlestop control mode, generally indicated by box 198, is generally represented in FIG. 12, and described in detail below.

Figure 13:
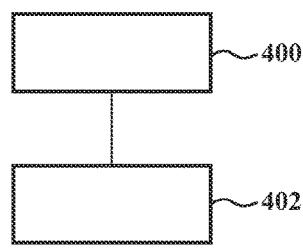
FIG. 13 is a flowchart representing a method of implementing an autostart control mode as the desired control mode.

If the vehicle controller 96 determines that the vehicle 10 is not currently executing an idlestop, generally indicated at 200, then the vehicle controller continues to determine if the vehicle is executing an autostart, generally indicated by box 202. As used herein, the term "autostart" is defined as the process of starting the engine after executing an autostop. As such, an autostart includes automatically starting the engine after an autostop, without any input from an operator of the vehicle. If the vehicle controller 96 determines that the vehicle is currently executing an autostart, generally indicated at 204, then the vehicle controller 96 signals to configure the powertrain 12A, 12B, 12C, 12D for an autostart control mode, generally indicated by box 206. The process of configuring the powertrain 12A, 12B, 12C, 12D for the autostart control mode, generally indicated by box 206, is generally represented in FIG. 13, and described in detail below.

Figure 14:
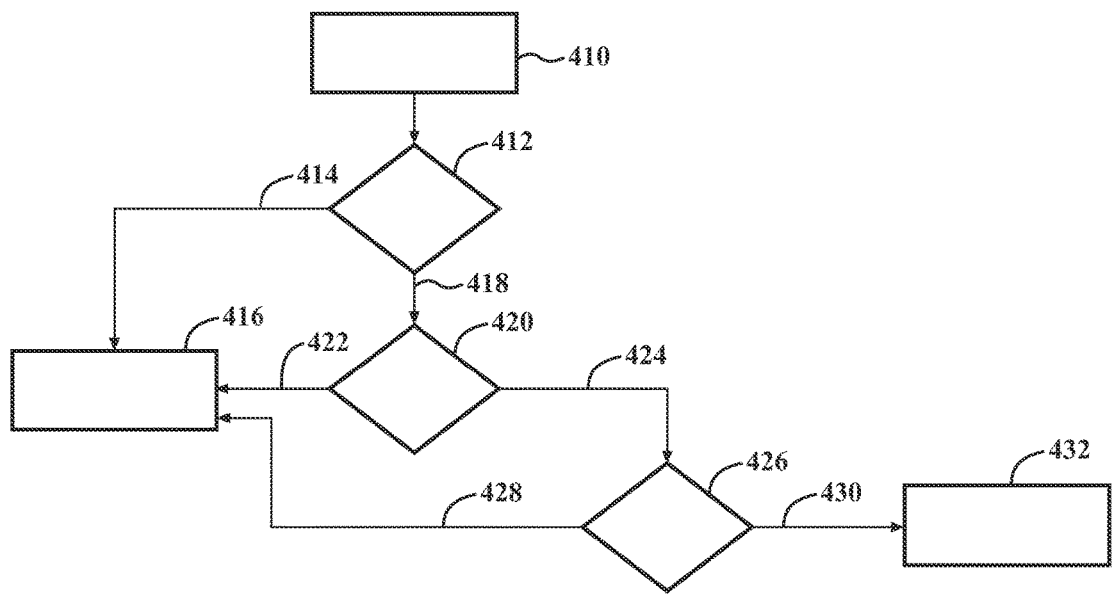
FIG. 14 is a flowchart representing a method of implementing a sailing control mode as the desired control mode.

If the vehicle controller 96 determines that the vehicle 10 is not currently executing an autostart, generally indicated at 208, then the vehicle controller continues to determine if the vehicle is sailing, generally indicated by box 210. In order to determine if the vehicle 10 is sailing, the vehicle controller 96 may compare the vehicle speed to a threshold sailing speed value, a throttle position to a threshold sailing throttle position value, and a brake fluid pressure at each caliper of the vehicle to a threshold sailing brake pressure value. The vehicle controller 96 may determine that the vehicle 10 is sailing, generally indicated at 212, if the speed of the vehicle is greater than a threshold sailing speed value, a throttle position of the vehicle is less than a threshold sailing throttle position value, and a brake fluid pressure at each brake caliper of the vehicle is less than a threshold sailing brake pressure value. If the vehicle controller 96 determines that the vehicle is sailing, generally indicated at 212, then the vehicle controller 96 signals to configure the powertrain 12A, 12B, 12C, 12D for a sailing control mode, generally indicated by box 214. The process of configuring the powertrain 12A, 12B, 12C, 12D for the sailing control mode, generally indicated by box 214, is generally represented in FIG. 14, and described in detail below.

Figure 15:
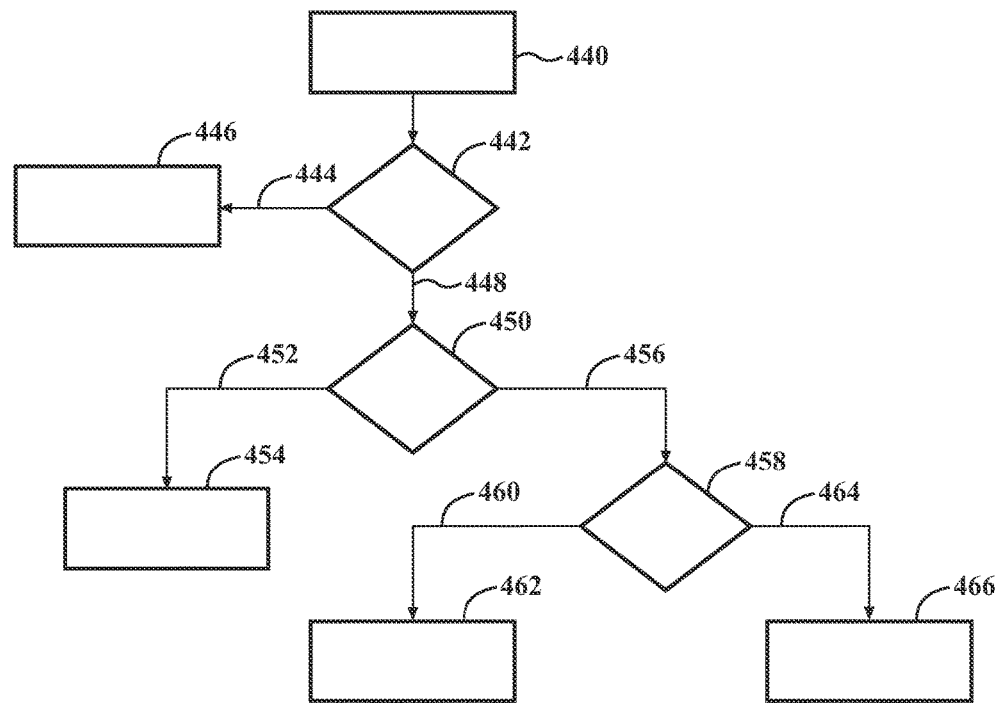
FIG. 15 is a flowchart representing a method of implementing a cruising control mode as the desired control mode.

The vehicle controller 96 may determine that the vehicle 10 is not sailing, generally indicated at 216, if the speed of the vehicle is not greater than the threshold sailing speed value, the throttle position of the vehicle is not less than the threshold sailing throttle position value, or the brake fluid pressure at each brake caliper of the vehicle is not less than the threshold sailing brake pressure value. If the vehicle controller 96 determines that the vehicle is not sailing, generally indicated at 216, then the vehicle controller 96 signals to configure the powertrain 12A, 12B, 12C, 12D for a cruising control mode, generally indicated by box 218. The process of configuring the powertrain 12A, 12B, 12C, 12D for the cruising control mode, generally indicated by box 218, is generally represented in FIG. 15, and described in detail below. The vehicle controller 96 continues to monitor the different operating conditions of the vehicle 10, generally indicated at 220, in order to determine which of the different control modes to select and/or reconfigure the powertrain 12A, 12B, 12C, 12D into.

Referring to FIG. 7, the process of configuring the powertrain 12A, 12B, 12C, 12D for the autostop control mode is generally shown. When in the autostop control mode, the engine 14 is not fueled, and the engine speed drops to zero. The auxiliary electric system 56 loads are supplied by one of either the first energy supply device 40 or the second energy supply device 42, depending upon their respective state of charge levels. The auxiliary electric system 56 load is supplied by the first energy storage device 40 by closing the first switching device 62 and the third switching device 64, while opening the second switching device 68. When the state of charge of the first energy storage device 40 drops below an allowable level, defined herein as the first threshold charge level, the second switching device 68 is closed so that the second energy storage device 42 may supply the load to the auxiliary electric system 56, and the first switching device 62 and the third switching device 64 are kept open. When the state of charge of the first energy storage device 40 is less than the first threshold charge level, and when the state of charge of the second energy storage device 42 drops below an allowable level, defined herein as the second threshold charge level, then the vehicle controller sends a command to the engine control module to exit the autostop control mode, and select a new desired control mode to configure the powertrain 12A, 12B, 12C, 12D for. The first threshold charge level and the second threshold charge level are defined or chosen to equal a value that will provide sufficient charge to enable subsequent engine restart when the vehicle controller 96 exits the autostop.

Referring to FIG. 7, if the vehicle controller 96 selects the autostop control mode as the desired control mode, generally indicated by box 230, then the vehicle controller determines if the state of charge of the first energy storage device 40 is greater than the first threshold charge level of the first energy storage device, generally indicated by box 232. If the vehicle controller 96 determines that the state of charge of the first energy storage device 40 is greater than the first threshold charge level, generally indicated at 234, then the vehicle controller 96 configures the powertrain 12A, 12B, 12C, 12D to enable the first energy storage device 40 to provide the load for the auxiliary electric system 56, generally indicated by box 236, in which the vehicle controller 96 positions the first actuator 92A and the second actuator 92B, into their respective open or disengaged states, positions the third actuator 70 into its respective closed state, positions the first switching device 62 and the third switching device 64 in the first closed state and the third closed state respectively, and positions the second switching device 68 in the second open state.

If the vehicle controller 96 determines that the state of charge of the first energy storage device 40 is not greater than the first threshold charge level, generally indicated at 238, then the vehicle controller 96 determines if the state of charge of the second energy storage device 42 is greater than the second threshold charge level, generally indicated by box 240. If the vehicle controller 96 determines that the state of charge of the second energy storage device 40 is greater than the second threshold charge level, generally indicated at 242, then the vehicle controller 96 configures the powertrain 12A, 12B, 12C, 12D to enable the second energy storage device 42 to provide the load for the auxiliary electric system 56, generally indicated by box 244, in which the vehicle controller 96 positions the first actuator 92A and the second actuator 92B, into their respective open or disengaged states, positions the third actuator 70 into its respective closed state, positions the first switching device 62 and the third switching device 64 in the first open state and the third open state respectively, and positions the second switching device 68 in the second closed state. The vehicle controller 96 continues to monitor the different operating conditions of the vehicle 10, generally indicated at 248, in order to monitor the state of charge of both the first energy storage device 40 and the second energy storage device 42, and determine if the configuration of the powertrain 12A, 12B, 12C, 12D should be modified.

If the vehicle controller 96 determines that the state of charge of the second energy storage device 40 is not greater than the second threshold charge level, generally indicated at 246, then neither the first energy storage device 40 nor the second energy storage device 42 have sufficient charge to operate the auxiliary electric system 56, and the vehicle controller 96 signals to end the autostop, and configure the powertrain 12A, 12B, 12C, 12D for a different control mode, generally indicated by box 250.

Referring to FIG. 8, the process of configuring the powertrain 12A, 12B, 12C, 12D for the discharge control mode is generally shown. When in the discharge control mode, the vehicle speed is equal to zero, and the engine 14 is idling. The motor-generator 38 may be off-loaded by supplying the auxiliary electric system 56 load using one of either the first energy storage device 40 or the second energy storage device 42, depending upon their respective state of charge levels. The auxiliary electric system 56 load is supplied by the first energy storage device 40 by closing the first switching device 62 and the third switching device 64, while opening the second switching device 68. A voltage set point of the motor-generator 38 is adjusted such that only the first energy storage device 40 supplies the load to the auxiliary electric system 56, and the torque load on the engine 14 from the motor-generator 38 is minimal. When the state of charge of the first energy storage device 40 drops below an allowable level, defined herein as the first threshold discharge level, the second switching device 68 is closed so that the second energy storage device 42 may supply the load to the auxiliary electric system 56, and the first switching device 62 and the third switching device 64 are kept open. The voltage set point of the motor-generator 38 is adjusted such that only the second energy storage device 42 supplies the load to the auxiliary electric system 56, and the torque load on the engine 14 from the motor-generator 38 is minimal.

When the state of charge of the first energy storage device 40 is less than the first threshold charge level, and when the state of charge of the second energy storage device 42 drops below an allowable level, defined herein as the second threshold discharge level, then the vehicle controller adjusts the voltage set point of the motor-generator 38 so that the motor-generator 38 supplies the load for the auxiliary electric system 56, and the first energy storage device 40 and/or the second energy storage device 42 may be charged.

Referring to FIG. 8, if the vehicle controller 96 selects the discharge control mode as the desired control mode, generally indicated by box 260, then the vehicle controller determines if the state of charge of the first energy storage device 40 is greater than the first threshold discharge level of the first energy storage device, generally indicated by box 262. If the vehicle controller 96 determines that the state of charge of the first energy storage device 40 is greater than the first threshold discharge level, generally indicated at 264, then the vehicle controller 96 configures the powertrain 12A, 12B, 12C, 12D to enable the first energy storage device 40 to provide the load for the auxiliary electric system 56 and adjusts the voltage set point of the motor-generator 38, generally indicated by box 266, in which the vehicle controller 96 positions the first actuator 92A and the second actuator 92B, into their respective open or disengaged states, positions the third actuator 70 into its respective closed state, positions the first switching device 62 and the third switching device 64 in the first closed state and the third closed state respectively, and positions the second switching device 68 in the second open state.

If the vehicle controller 96 determines that the state of charge of the first energy storage device 40 is not greater than the first threshold charge level, generally indicated at 268, then the vehicle controller 96 determines if the state of charge of the second energy storage device 42 is greater than the second threshold discharge level, generally indicated by box 270. If the vehicle controller 96 determines that the state of charge of the second energy storage device 40 is greater than the second threshold discharge level, generally indicated at 272, then the vehicle controller 96 configures the powertrain 12A, 12B, 12C, 12D to enable the second energy storage device 42 to provide the load for the auxiliary electric system 56 and adjusts the voltage set point of the motor-generator 38, generally indicated by box 274, in which the vehicle controller 96 positions the first actuator 92A and the second actuator 92B, into their respective open or disengaged states, positions the third actuator 70 into its respective closed state, positions the first switching device 62 and the third switching device 64 in the first open state and the third open state respectively, and positions the second switching device 68 in the second closed state.

If the vehicle controller 96 determines that the state of charge of the second energy storage device 40 is not greater than the second threshold discharge level, generally indicated at 276, then neither the first energy storage device 40 nor the second energy storage device 42 have sufficient charge to operate the auxiliary electric system 56, and the vehicle controller 96 signals to increase the voltage set point of the motor-generator 38, generally indicated by box 278, so that the motor-generator 38 may supply the load to the auxiliary electric system 56 and charge the first energy storage device 40 and/or the second energy storage device 42.

Referring to FIG. 9, the process of configuring the powertrain 12A, 12B, 12C, 12D for the acceleration control mode is generally shown. When the vehicle 10 is accelerating, it may be possible to provide torque assist to the engine 14 through the motor-generator 38. The vehicle controller 96 determines if electric boost, i.e., torque assist, is possible and/or desired based on the current operating conditions of the vehicle 10. When the vehicle 10 is accelerating and the vehicle controller 96 is signaling for or requesting torque assist for the engine 14. The motor-generator 38 is set to operate as a motor to provide torque assist to the engine 14, and is supplied with power from the first energy storage device 40, if the state of charge of the first energy storage device 40 is greater than a first threshold boost level. If the state of charge of the first energy storage device 40 is not greater than the first threshold boost level, then the motor-generator 38 is supplied with power from the second energy storage device 42, if the state of charge of the second energy storage device 42 is greater than a second threshold boost level. If the state of charge of the first energy storage device 40 is not greater than the first threshold boost level, and the state of charge of the second energy storage device 42 is not greater than the second threshold boost level, then the motor-generator 38 does not provide any torque assist to the engine 14, and the motor-generator 38 operates as a generator, but is off-loaded by supplying the load for the auxiliary electric system 56 with power from one of either the first energy storage device 40 or the second energy storage device 42 to minimize the power draw on the engine 14. The motor-generator 38 may be off-loaded in accordance with the discharge control mode described above with reference to FIG. 8.

Referring to FIG. 9, if the vehicle controller 96 selects the acceleration control mode as the desired control mode, generally indicated by box 290, then the vehicle controller 96 determines if torque assist is requested, generally indicated by box 292. If the vehicle controller 96 determines that torque assist is not currently being requested, generally indicated at 294, then the vehicle controller 96 configures the powertrain 12A, 12B, 12C, 12D to off-load the motor-generator 38, generally indicated by box 296, and configures the powertrain 12A, 12B, 12C, 12D for the discharge control mode, described above with reference to FIG. 8.

If the vehicle controller 96 determines that torque assist is requested, generally indicated at 298, then the vehicle controller 96 determines if the state of charge of the first energy storage device 40 is greater than the first threshold boost level of the first energy storage device 40, generally indicated by box 300. If the vehicle controller 96 determines that the state of charge of the first energy storage device 40 is greater than the first threshold boost level, generally indicated at 302, then the vehicle controller 96 configures the powertrain 12A, 12B, 12C, 12D to enable the first energy storage device 40 to provide the load for the motor-generator 38 to provide torque assist to the engine 14, generally indicated by box 304, in which the vehicle controller 96 positions the first actuator 92A and the second actuator 92B, into their respective open or disengaged states, positions the third actuator 70 into its respective closed state, positions the first switching device 62 in the first closed state, and positions the second switching device 68 and the third switching device 64 in the second open state and the third open state respectively.

If the vehicle controller 96 determines that the state of charge of the first energy storage device 40 is not greater than the first threshold boost level, generally indicated at 306, then the vehicle controller 96 determines if the state of charge of the second energy storage device 42 is greater than the second threshold boost level, generally indicated by box 308. If the vehicle controller 96 determines that the state of charge of the second energy storage device 40 is greater than the second threshold discharge level, generally indicated at 310, then the vehicle controller 96 configures the powertrain 12A, 12B, 12C, 12D to enable the second energy storage device 42 to power the motor-generator 38 to provide torque assist to the engine 14, generally indicated by box 312, in which the vehicle controller 96 positions the first actuator 92A and the second actuator 92B, into their respective open or disengaged states, positions the third actuator 70 into its respective closed state, positions the first switching device 62 in the first open state, and positions the second switching device 68 and the third switching device in the second closed state and the third closed state respectively.

If the vehicle controller 96 determines that the state of charge of the second energy storage device 40 is not greater than the second threshold boost level, generally indicated at 314, then neither the first energy storage device 40 nor the second energy storage device 42 have sufficient charge to operate the motor-generator 38 as a motor to provide electric boost to the engine 14, and the vehicle controller 96 configures the powertrain 12A, 12B, 12C, 12D to off-load the motor-generator 38, generally indicated by box 296, and configures the powertrain 12A, 12B, 12C, 12D for the discharge control mode, described above with reference to FIG. 8.

The vehicle controller 96 continues to monitor the different operating conditions of the vehicle 10, generally indicated at 316, in order to monitor the state of charge of both the first energy storage device 40 and the second energy storage device 42, and determine if the configuration of the powertrain 12A, 12B, 12C, 12D should be modified.

Referring to FIG. 10 the process of configuring the powertrain 12A, 12B, 12C, 12D for the deceleration control mode is generally shown. When the vehicle 10 is decelerating, it may be possible charge either the first energy storage device 40 and/or the second energy storage device 42 through energy regeneration. When the vehicle 10 is decelerating, and the vehicle controller is currently requesting regeneration of at least one either the first energy storage device 40 or the second energy storage device 42, then the motor-generator 38 may be operated as a generator to charge one or both of the first energy storage device 40 and the second energy storage device 42, depending upon their current, respective state of charge. The torque level to the motor-generator 38 is adjusted to optimally charge either the first energy storage device 40 or the second energy storage device 42, until the vehicle controller 96 determines that regeneration or charging of the first energy storage device 40 and/or the second energy storage device 42 is no longer required, or until the vehicle is no longer decelerating.

Referring to FIG. 10, if the vehicle controller 96 selects the deceleration control mode as the desired control mode, generally indicated by box 320, then the vehicle controller 96 determines if regenerative charging of either the first energy storage device 40 or the second energy storage device 40 is currently being requested, generally indicated by box 322. If the vehicle controller 96 determines that regenerative charging is currently being requested, generally indicated at 324, then the vehicle controller 96 configures the powertrain 12A, 12B, 12C, 12D for a regenerative charging control mode, generally indicated by box 326, described above with reference to FIG. 11. Upon configuring the powertrain 12A, 12B, 12C, 12D for the regenerative charging control mode, the vehicle controller 96 continues to monitor the operating conditions of the vehicle to determine if the vehicle is continuing to decelerate, generally indicated by box 328.

If the vehicle controller 96 determines that the vehicle 10 continues to decelerate, generally indicated at 330, then the vehicle controller 96 continues the process to determine if regenerative charging is still being requested, generally indicated by box 322. If the vehicle controller 96 determines that the vehicle 10 is not still decelerating, generally indicated at 332, then the deceleration control mode is ended, generally indicated by box 334.

If the vehicle controller 96 determines that regenerative charging is not currently being requested, generally indicated at 336, then the vehicle controller 96 continues to monitor the operating conditions of the vehicle to determine if the vehicle is continuing to decelerate, generally indicated by box 328.

Figure 11:
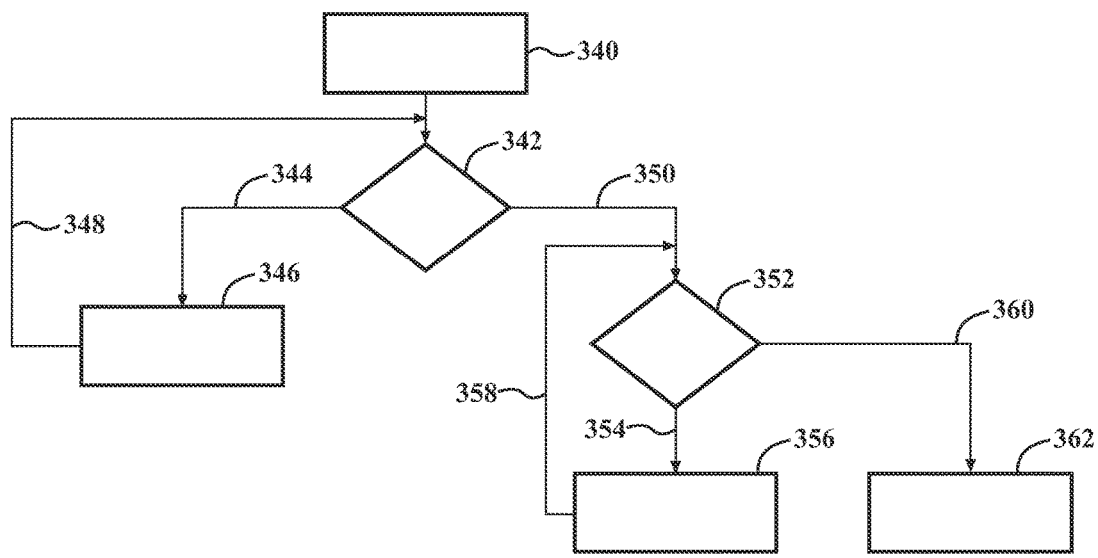
FIG. 11 is a flowchart representing a method of implementing a regenerative charging control mode.

Referring to FIG. 11, the process of configuring the powertrain 12A, 12B, 12C, 12D for the regenerative charging control mode is generally shown. When in the regenerative charging control mode, the motor-generator 38 is operated as a generator to produce a charge for charging one or both of the first energy storage device 40 or the second energy storage device 42. When the vehicle 10 is decelerating and regenerative charging is currently being requested by the vehicle controller 96, then the motor-generator 38 charges the first energy storage device 40 if the state of charge of the first energy storage device 40 is less than a first threshold regenerative charging level. If the state of charge of the first energy storage device 40 is not less than the first threshold regenerative charging level, then the motor-generator 38 is used as a generator to charge the second energy storage device 42, if the state of charge of the second energy storage device 42 is less than a second threshold regenerative charging level. If the state of charge of the first energy storage device 40 is not less than the first threshold regenerative charging level, and the state of charge of the second energy storage device 42 is not less than the second threshold regenerative charging level, then neither of the first energy storage device 40 or the second energy storage device 42 require charging, and the regenerative energy from the motor-generator 38 is only used to supply the electric load for the auxiliary electric system 56.

Referring to FIG. 11, if the vehicle controller 96 selects the regenerative charging control mode as the desired control mode, generally indicated by box 340, then the vehicle controller determines if the state of charge of the first energy storage device 40 is less than the first threshold regenerative charging level of the first energy storage device 40, generally indicated by box 342. If the vehicle controller 96 determines that the state of charge of the first energy storage device 40 is less than the first threshold regenerative charging level, generally indicated at 344, then the vehicle controller 96 configures the powertrain 12A, 12B, 12C, 12D to enable the motor-generator 38 to charge the first energy storage device 40, generally indicated by box 346, in which the vehicle controller 96 positions the first actuator 92A and the second actuator 92B, into their respective open or disengaged states, positions the third actuator 70 into its respective closed state, positions the first switching device 62 in the first closed state, and positions the second switching device 68 and the third switching device 62 in the second open state and the third open state respectively. The vehicle controller 96 continues to monitor the different operating conditions of the vehicle 10, generally indicated at 348, in order to monitor the state of charge of both the first energy storage device 40 and the second energy storage device 42, and determine if the configuration of the powertrain 12A, 12B, 12C, 12D should be modified.

If the vehicle controller 96 determines that the state of charge of the first energy storage device 40 is not less than the first threshold regenerative charging level, generally indicated at 350, then the vehicle controller 96 determines if the state of charge of the second energy storage device 42 is less than the second threshold regenerative charging level, generally indicated by box 352. If the vehicle controller 96 determines that the state of charge of the second energy storage device 40 is less than the second threshold regenerative charging level, generally indicated at 354, then the vehicle controller 96 configures the powertrain 12A, 12B, 12C, 12D to enable the motor-generator 38 to charge the second energy storage device 42, generally indicated by box 356, in which the vehicle controller 96 positions the first actuator 92A and the second actuator 92B, into their respective open or disengaged states, positions the third actuator 70 into its respective closed state, positions the first switching device 62 in the first open state, and positions the second switching device 68 and the third switching device 64 in the second closed state and the third closed state respectively. The vehicle controller 96 continues to monitor the different operating conditions of the vehicle 10, generally indicated at 358, in order to monitor the state of charge of both the first energy storage device 40 and the second energy storage device 42, and determine if the configuration of the powertrain 12A, 12B, 12C, 12D should be modified.

If the vehicle controller 96 determines that the state of charge of the second energy storage device 40 is not less than the second threshold regenerative charging level, generally indicated at 360, then neither the first energy storage device 40 nor the second energy storage device 42 require charging, and the motor-generator 38 is operated as a generator and used to supply the electrical load to the auxiliary electric system 56, generally indicated by box 362.

Referring to FIG. 12, the process of configuring the powertrain 12A, 12B, 12C, 12D for the idlestop control mode is generally shown. When in the idlestop control mode, the engine 14 is fueled, and is running, however, the vehicle is not moving. The auxiliary electric system 56 loads may be supplied by one of either the first energy supply device 40 or the second energy supply device 42, depending upon their respective state of charge levels, or by the motor-generator 38 operating as a generator.

If the vehicle controller 96 selects the idlestop control mode as the desired control mode, generally indicated by box 370, then the vehicle controller determines if the state of charge of the first energy storage device 40 is less than a first threshold idlestop charge level of the first energy storage device 40, generally indicated by box 372. If the vehicle controller 96 determines that the state of charge of the first energy storage device 40 is less than the first threshold idlestop charge level, generally indicated at 374, then the vehicle controller 96 configures the powertrain 12A, 12B, 12C, 12D to enable the first energy storage device 40 to provide the load for the auxiliary electric system 56 and adjusts the voltage set point of the motor-generator 38, generally indicated by box 376, in which the vehicle controller 96 positions the first actuator 92A and the second actuator 92B, into their respective open or disengaged states, positions the third actuator 70 into its respective closed state, positions the first switching device 62 and the third switching device 64 in the first closed state and the third closed state respectively, and positions the second switching device 68 in the second open state. The vehicle controller 96 continues to monitor the different operating conditions of the vehicle 10, generally indicated at 378, in order to monitor the state of charge of both the first energy storage device 40 and the second energy storage device 42, and determine if the configuration of the powertrain 12A, 12B, 12C, 12D should be modified. The voltage set point of the motor-generator 38 is adjusted to a low level to minimize the required power from the engine 14 to improve fuel economy.

If the vehicle controller 96 determines that the state of charge of the first energy storage device 40 is not less than the first idlestop charge level, generally indicated at 380, then the vehicle controller 96 determines if the state of charge of the second energy storage device 42 is less than the second threshold idlestop charge level, generally indicated by box 382. If the vehicle controller 96 determines that the state of charge of the second energy storage device 40 is less than the second threshold idlestop charge level, generally indicated at 384, then the vehicle controller 96 configures the powertrain 12A, 12B, 12C, 12D to enable the second energy storage device 40 to provide the load for the auxiliary electric system 56 and adjusts the voltage set point of the motor-generator 38, generally indicated by box 386, in which the vehicle controller 96 positions the first actuator 92A and the second actuator 92B, into their respective open or disengaged states, positions the third actuator 70 into its respective closed state, positions the first switching device 62 and the third switching device 64 in the first open state and the third open state respectively, and positions the second switching device 68 in the second closed state. The vehicle controller 96 continues to monitor the different operating conditions of the vehicle 10, generally indicated at 388, in order to monitor the state of charge of both the first energy storage device 40 and the second energy storage device 42, and determine if the configuration of the powertrain 12A, 12B, 12C, 12D should be modified. The voltage set point of the motor-generator 38 is adjusted to a low level to minimize the required power from the engine 14 to improve fuel economy.

If the vehicle controller 96 determines that the state of charge of the second energy storage device 40 is not less than the second threshold idlestop charge level, generally indicated at 390, then neither the first energy storage device 40 nor the second energy storage device 42 have sufficient charge to operate the auxiliary electric system 56, and the vehicle controller 96 signals 392, so that the motor-generator 38 may supply the load to the auxiliary electric system 56.

Referring to FIG. 13, the process of configuring the powertrain 12A, 12B, 12C, 12D for the autostart control mode is generally shown. When in the autostart control mode, the engine 14 is automatically started by the vehicle controller 96, after being automatically stopped by the vehicle controller 96 via the autostop control mode.

If the vehicle controller 96 selects the autostart control mode as the desired control mode, generally indicated by box 400, then the vehicle controller configures the powertrain 12A, 12B, 12C, 12D to start the engine 14, generally indicated by box 402, in which the vehicle controller 96 positions the first actuator 92A and the second actuator 92B, into their respective open or disengaged states, positions the third actuator 70 into its respective closed state, positions the first switching device 62 and the second switching device 68 in the first closed state and the second closed state respectively, and positions the third switching device 64 in the third open state. In so doing, the first energy storage device 40 supplies power to the motor-generator 38 or the starter mechanism 60 to start the engine 14, while the second energy storage device supplies power to the auxiliary electric system 56.

Referring to FIG. 14, the process of configuring the powertrain 12A, 12B, 12C, 12D for the sailing control mode is generally shown. When in the sailing control mode, the speed of the vehicle 10 is greater than a predetermined speed threshold, the brake fluid pressure at the brake calipers of the vehicle 10 is less than and a threshold sailing brake pressure, and the throttle position is less than a threshold sailing throttle position. When in the sailing control mode, the electrical load for the auxiliary electric system 56 is supplied by the second energy storage device 42, so long as the state of charge of the second energy storage device 42 is greater than a threshold sailing value. The sailing control mode maintains the state of charge of the second energy storage device 42 above the threshold sailing value so that the second energy storage device 42 is able to restart the when the sailing control mode is exited. The sailing control mode is exited when the state of charge of the first energy storage device 40 falls below the threshold restart value for the first energy storage device 40, and the state of charge of the second energy storage device 42 falls below the threshold restart value for the second energy storage device 42.

Referring to FIG. 14, if the vehicle controller 96 selects the sailing control mode as the desired control mode, generally indicated by box 410, then the vehicle controller 96 determines if the position of the throttle of the vehicle 10 is greater than the threshold sailing throttle position, and if the brake fluid pressure at each brake caliper of the vehicle 10 is greater than the threshold sailing brake pressure, generally indicated by box 412. If the vehicle controller 96 determines that the throttle position is not greater than the threshold sailing throttle position, or if the brake fluid pressure is not greater than the threshold sailing brake pressure, generally indicated at 414, then the vehicle controller 96 configures the powertrain 12A, 12B, 12C, 12D to end the sailing control mode, generally indicated by box 416, in which the vehicle controller 96 positions the first actuator 92A and the second actuator 92B, into their respective open or disengaged states, positions the third actuator 70 into its respective closed state, positions the first switching device 62 and the second switching device 68 in the first closed state and the second closed state respectively, and positions the third switching device 64 in the third open state.

If the vehicle controller 96 determines that the throttle position is greater than the threshold sailing throttle position, and that the brake fluid pressure is greater than the threshold sailing brake pressure, generally indicated at 418, then the vehicle controller 96 determines if the state of charge of the first energy storage device 40 is greater than the threshold restart value, generally indicated by box 420. If the vehicle controller 96 determines that the state of charge of the first energy storage device 40 is not greater than the threshold restart value, generally indicated at 422, then the vehicle controller 96 configures the powertrain 12A, 12B, 12C, 12D to end the sailing control mode, generally indicated by box 416.

If the vehicle controller 96 determines that the state of charge of the first energy storage device 40 is greater than the threshold restart value, generally indicated at 424, then the vehicle controller determines if the state of charge of the second energy storage device 42 is greater than the threshold sailing value, generally indicated by box 426. If the vehicle controller 96 determines that the state of charge of the second energy storage device 42 is not greater than the threshold sailing value, generally indicated at 428, then the vehicle controller 96 configures the powertrain 12A, 12B, 12C, 12D to end the sailing control mode, generally indicated by box 416. However, if the vehicle controller 96 determines that the state of charge of the second energy storage device 42 is greater than the threshold sailing value, generally indicated at 430, then the vehicle controller 96 configures the powertrain 12A, 12B, 12C, 12D to continue the sailing control mode, generally indicated by box 432, in which the vehicle controller 96 positions the first actuator 92A and the second actuator 92B, into their respective open or disengaged states, positions the third actuator 70 into its respective closed state, positions the first switching device 62 and the second switching device 68 in the first open state and the second open state respectively, and positions the third switching device 64 in the third closed state.

Referring to FIG. 15 the process of configuring the powertrain 12A, 12B, 12C, 12D for the cruising control mode is generally shown. When the vehicle 10 is cruising at a steady speed, it may be possible to use "opportunity charging', whereby the first energy storage device 40 and/or the second energy storage device 42 are charged by the motor-generator 38, while the engine is still being fueled. This moves the engine operating point to a more efficient region. The energy stored in either the first energy storage device 40 or the second energy storage device 42 may be used for off-loading the motor-generator 38 at a later time. If the vehicle controller 96 determines that opportunity charging is possible, then the motor-generator 38 operates as a generator to charge the first energy storage device 40, if the state of charge of the first energy storage device 40 is not greater than a first threshold cruising charge level. If the state of charge of the first energy storage device 40 is greater than the first threshold cruising charge level, then the motor-generator 38 operates as a generator to charge the second energy storage device 42, if the state of charge of the second energy storage device 42 is not greater than a second threshold cruising charge level. If the state of charge of the first energy storage device 40 is greater than the first threshold cruising charge level, and the state of charge of the second energy storage device 42 is greater than the second threshold cruising charge level, then the motor-generator 38 operates as a generator to supply the electrical load to the auxiliary electric system 56 directly, by opening the first switching device 62 and the second switching device 68, and closing the third switching device 64. If the vehicle controller 96 determines that opportunity charging is not possible or requested, then the vehicle controller 96 configures the powertrain 12A, 12B, 12C, 12D for the discharge control mode described above with reference to FIG. 8.

Referring to FIG. 15, if the vehicle controller 96 selects the cruising control mode as the desired control mode, generally indicated by box 440, then the vehicle controller 96 determines if opportunity charging is requested, generally indicated by box 442. If the vehicle controller 96 determines that opportunity charging is not currently being requested, generally indicated at 444, then the vehicle controller 96 configures the powertrain 12A, 12B, 12C, 12D for the discharge control mode, generally indicated by box 446, described above with reference to FIG. 8.

If the vehicle controller 96 determines that opportunity charging is requested, generally indicated at 448, then the vehicle controller 96 determines if the state of charge of the first energy storage device 40 is greater than the first threshold cruising charge level of the first energy storage device 40, generally indicated by box 450. If the vehicle controller 96 determines that the state of charge of the first energy storage device 40 is not greater than the first threshold cruising charge level, generally indicated at 452, then the vehicle controller 96 configures the powertrain 12A, 12B, 12C, 12D to charge the first energy storage device 40, generally indicated by box 454, in which the vehicle controller 96 positions the first actuator 92A and the second actuator 92B, into their respective open or disengaged states, positions the third actuator 70 into its respective closed state, positions the first switching device 62 and the third switching device 64 in the first closed state and the third closed state respectively, and positions the second switching device 68 in the second open state.

If the vehicle controller 96 determines that the state of charge of the first energy storage device 40 is greater than the first threshold cruising charge level, generally indicated at 456, then the vehicle controller 96 determines if the state of charge of the second energy storage device 42 is greater than the second threshold cruising charge level, generally indicated by box 458. If the vehicle controller 96 determines that the state of charge of the second energy storage device 40 is not greater than the second threshold cruising charge level, generally indicated at 460, then the vehicle controller 96 configures the powertrain 12A, 12B, 12C, 12D to charge the second energy storage device 42, generally indicated by box 462, in which the vehicle controller 96 positions the first actuator 92A and the second actuator 92B, into their respective open or disengaged states, positions the third actuator 70 into its respective closed state, positions the first switching device 62 in the first open state, and positions the second switching device 68 and the third switching device 64 in the second closed state and the third closed state respectively.

If the vehicle controller 96 determines that the state of charge of the second energy storage device 40 is greater than the second threshold cruising charge level, generally indicated at 464, then neither the first energy storage device 40 nor the second energy storage device 42 require charging, and the vehicle controller 96 configures the powertrain 12A, 12B, 12C, 12D for the discharge control mode, generally indicated by box 466, and described above with reference to FIG. 8.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a powertrain of a vehicle, the powertrain including an internal combustion engine, a motor-generator coupled to the engine and having at least one actuator for connecting the motor-generator with the engine, a starter mechanism coupled to a crankshaft of the engine and having at least one actuator for engaging the starter mechanism with the crankshaft, at least one energy storage device, and at least one switch for connecting the at least one energy storage device to the motor-generator or the starter mechanism, the method comprising:
  sensing a plurality of operating conditions of the vehicle with a vehicle controller;
  sensing an operating mode of a transmission with the vehicle controller to determine if the transmission is currently disposed in one of either a reverse drive mode or a forward drive mode, or if the transmission is not currently disposed in either of the reverse drive mode or the forward drive mode;
  selecting a desired control mode from a plurality of available control modes based on the current operating conditions of the vehicle, with the vehicle controller, when the transmission is currently disposed in one of the reverse drive mode or the forward drive mode;
  controlling a position of the at least one switch, engagement of the at least one actuator of the starter mechanism, and engagement of the at least one actuator of the motor-generator, with the vehicle controller, to configure the powertrain in the desired control mode;
  sensing movement of the vehicle and a fueling state of the engine, with the vehicle controller, when the transmission is not currently disposed in either of the reverse drive mode or the forward drive mode, to determine if the vehicle is executing an autostop in which the vehicle is not moving and the engine is not being fueled and is not running, or if the vehicle is not currently executing the autostop;
  controlling the position of the at least one switch, engagement of the at least one actuator of the starter mechanism, and engagement of the at least one actuator of the motor-generator, with the vehicle controller, when the transmission is not currently disposed in one of the reverse drive mode or the forward drive mode and the vehicle is executing the autostop, to configure the powertrain in an autostop control mode; and
  controlling the position of the at least one switch, engagement of the at least one actuator of the starter mechanism, and engagement of the at least one actuator of the motor-generator, with the vehicle controller, to configure the powertrain in a discharge control mode to off-load the motor-generator when the transmission is not currently disposed in either of the reverse drive mode or the forward drive mode, and when the vehicle is not currently executing the autostop.

2. The method set forth in claim 1 wherein the plurality of available control modes includes: an acceleration control mode, a deceleration control mode, an idlestop control mode, an autostart control mode, a sailing control mode, a regenerative charging control mode, a cruising control mode, the autostop control mode, and the discharge control mode.

3. The method set forth in claim 2 wherein the powertrain further includes, an auxiliary electric system in electrical communication with the motor-generator, and wherein:
  the at least one actuator of the starter mechanism includes a first actuator, and a second actuator;
  the at least one actuator of the motor-generator includes a motor/generator clutch defined as a third actuator;
  the at least one energy storage device includes a first energy storage device disposed in a parallel electrical relationship with the motor-generator and the auxiliary electric system, and a second energy storage device disposed in a parallel electrical relationship with the first energy storage device, the motor-generator and the auxiliary electric system;
  the at least one switch includes a first switching device, a second switching device, and a third switching device;
  wherein the first switching device is selectively transitionable between a first open state to electrically disconnect the first energy storage device from at least one of the motor-generator, the starter mechanism, and the auxiliary electric system, and a first closed state to electrically connect the first energy storage device to at least one of the motor-generator, the starter mechanism and the auxiliary electric system, with electrical communication between the motor-generator and the auxiliary electric system being independent of the first switching device being in the first open state and the first closed state;

wherein the first energy storage device is disposed between an electrical bus and an electrical ground, and the first switching device is disposed between the first energy storage device and the electrical bus such that the first energy storage device is in direct electrical communication with the electrical bus when the first switching device is in the first closed state;

wherein the second switching device is selectively transitionable between a second open state to electrically disconnect the second energy storage device from at least one of the motor-generator, the starter mechanism, and the auxiliary electric system, and a second closed state to electrically connect the second energy storage device to at least one of the motor-generator, the starter mechanism, and the auxiliary electric system, with electrical communication between the motor-generator and the auxiliary electric system being independent of the second switching device being in the second open and closed states;

wherein the second energy storage device is disposed between the electrical bus and the electrical ground, and the second switching device is disposed between the second energy storage device and the electrical bus such that the second energy storage device is in direct electrical communication with the electrical bus when the second switching device is in the second closed state;

wherein the third switching device is disposed in a serial electrical relationship with the motor-generator and the auxiliary electric system, disposed downstream from the motor-generator and the first energy storage device along the electrical bus, and wherein the third switching device is disposed upstream from the second energy storage device and the auxiliary electric system along the electrical bus; and wherein the third switching device is selectively transitionable between a third open state to electrically disconnect the auxiliary electric system from at least one of the motor-generator and the first energy storage device, and a third closed state to electrically connect the auxiliary electric system to at least one of the motor-generator and the first energy storage device.

4. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the autostop control mode, and when a state of charge of the first energy storage device is greater than a first threshold charge level of the first energy storage device, includes disengaging the first actuator, disengaging the second actuator, engaging the third actuator, positioning the first switching device in the first closed state, positioning the second switching device in the second open state, and positioning the third switching device in the third closed state.

5. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the autostop control mode, a state of charge of the first energy storage device is not greater than a first threshold charge level of the first energy storage device, and when a state of charge of the second energy storage device is greater than a second threshold charge level of the second energy storage device, includes disengaging the first actuator, disengaging the second actuator, engaging the third actuator, positioning the first switching device in the first open state, positioning the second switching device in the second closed state, and positioning the third switching device in the third open state.

6. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the discharge control mode, and when a state of charge of the first energy storage device is greater than a first threshold discharge level of the first energy storage device, includes disengaging the first actuator, disengaging the second actuator, engaging the third actuator, positioning the first switching device in the first closed state, positioning the second switching device in the second open state, and positioning the third switching device in the third closed state.

7. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the discharge control mode, a state of charge of the first energy storage device is not greater than a first threshold discharge level of the first energy storage device, and when a state of charge of the second energy storage device is greater than a generator off-loading threshold value, includes disengaging the first actuator, disengaging the second actuator, engaging the third actuator, positioning the first switching device in the first open state, positioning the second switching device in the second closed state, and positioning the third switching device in the third open state.

8. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the acceleration control mode, and when a state of charge of the first energy storage device is greater than a first threshold boost level of the first energy storage device, includes disengaging the first actuator, disengaging the second actuator, engaging the third actuator, positioning the first switching device in the first closed state, positioning the second switching device in the second open state, and positioning the third switching device in the third open state.

9. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the acceleration control mode, a state of charge of the first energy storage device is not greater than a first threshold boost level of the first energy storage device, and when a state of charge of the second energy storage device is greater than a second threshold boost level of the second energy storage device, includes disengaging the first actuator, disengaging the second actuator, engaging the third actuator, positioning the first switching device in the first open state, positioning the second switching device in the second closed state, and positioning the third switching device in the third closed state.

10. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the regenerative charging control mode, and when a state of charge of the first energy storage device is less than a first threshold regenerative charging level of the first energy storage device, includes disengaging the first actuator, disengaging the second actuator, engaging the third actuator, positioning the first switching device in the first closed state, positioning the second switching device in the second open state, and positioning the third switching device in the third open state.

11. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the regenerative charging control mode, a state of charge of the first energy storage device is not less than a first threshold regenerative charging level of the first energy storage device, and when a state of charge of the second energy storage device is less than a second threshold regenerative charging level of the second energy storage device, includes disengaging the first actuator, disengaging the second actuator, engaging the third actuator, positioning the first switching device in the first open state, positioning the second switching device in the second closed state, and positioning the third switching device in the third closed state.

12. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the cruising control mode, and when a state of charge of the first energy storage device is not greater than a first threshold cruising charge level of the first energy storage device, includes disengaging the first actuator, disengaging the second actuator, engaging the third actuator, positioning the first switching device in the first closed state, positioning the second switching device in the second open state, and positioning the third switching device in the third closed state.

13. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the cruising control mode, a state of charge of the first energy storage device is greater than a first threshold cruising charge level of the first energy storage device, and a state of charge of the second energy storage device is not greater than a second threshold cruising charge level, includes disengaging the first actuator, disengaging the second actuator, engaging the third actuator, positioning the first switching device in the first open state, positioning the second switching device in the second closed state, and positioning the third switching device in the third closed state.

14. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the idlestop control mode, and when a state of charge of the first energy storage device is less than a first threshold idlestop charge level of the first energy storage device, includes disengaging the first actuator, disengaging the second actuator, engaging the third actuator, positioning the first switching device in the first closed state, positioning the second switching device in the second open state, and positioning the third switching device in the third closed state.

15. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the idlestop control mode, a state of charge of the first energy storage device is not less than a first threshold idlestop charge level of the first energy storage device, and when a state of charge of the second energy storage device is less than a second threshold idlestop charge level of the second energy storage device, includes disengaging the first actuator, disengaging the second actuator, engaging the third actuator, positioning the first switching device in the first open state, positioning the second switching device in the second closed state, and positioning the third switching device in the third open state.

16. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the autostart control mode, includes disengaging the first actuator, disengaging the second actuator, engaging the third actuator, positioning the first switching device in the first closed state, positioning the second switching device in the second closed state, and positioning the third switching device in the third open state.

17. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the sailing control mode, a throttle position of the vehicle is not greater than a threshold sailing throttle position, and a brake fluid pressure at each caliper of the vehicle is not greater than a threshold sailing brake pressure, includes configuring the powertrain for an end sailing mode in which the first actuator is disengaged, the second actuator is disengaged, the third actuator is engaged, the first switching device is positioned in the first closed state, the second switching device is positioned in the second closed state, and the third switching device is positioned in the third open state.

18. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the sailing control mode, when a throttle position of the vehicle is greater than a threshold sailing throttle position, a brake fluid pressure at each caliper of the vehicle is greater than a threshold sailing brake pressure, and when a state of charge of the first energy storage device is not greater than a threshold restart value for the first energy storage device, includes configuring the powertrain for an end sailing mode in which the first actuator is disengaged, the second actuator is disengaged, the third actuator is engaged, the first switching device is positioned in the first closed state, the second switching device is positioned in the second closed state, and the third switching device is positioned in the third open state.

19. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the sailing control mode, when a throttle position of the vehicle is greater than a threshold sailing throttle position, a brake fluid pressure at each caliper of the vehicle is greater than a threshold sailing brake pressure, a state of charge of the first energy storage device is greater than a threshold restart value for the first energy storage device, and when a state of charge of the second energy storage device is not greater than a threshold sailing value for the second energy storage device, includes configuring the powertrain for a maintain sailing mode in which the first actuator is disengaged, the second actuator is disengaged, the third actuator is engaged, the first switching device is positioned in the first open state, the second switching device is positioned in the second open state, and the third switching device is positioned in the third closed state.

20. The method set forth in claim 3 wherein controlling the position of the at least one switch, engagement of the at least one actuator of the starter mechanism, and engagement of the at least one actuator of the motor-generator to configure the powertrain in the desired control mode, when the desired control mode is selected to include the sailing control mode, when a throttle position of the vehicle is greater than a threshold sailing throttle position, a brake fluid pressure at each caliper of the vehicle is greater than a threshold sailing brake pressure, a state of charge of the first energy storage device is greater than a threshold restart value for the first energy storage device, and when a state of charge of the second energy storage device is greater than a threshold sailing value for the second energy storage device, includes configuring the powertrain for an end sailing mode in which the first actuator is disengaged, the second actuator is disengaged, the third actuator is engaged, the first switching device is positioned in the first closed state, the second switching device is positioned in the second closed state, and the third switching device is positioned in the third open state.

21. The method set forth in claim 2 wherein sensing the plurality of operating conditions of the vehicle with the vehicle controller includes sensing a speed of the vehicle, an acceleration of the vehicle, a deceleration of the vehicle, the fueling state of the engine, a throttle position of the engine, and a brake fluid pressure at each brake caliper of the vehicle.

22. The method set forth in claim 21 wherein selecting the desired control mode based on the current operating conditions of the vehicle when the transmission is currently disposed in one of the reverse drive mode or the forward drive mode includes selecting the acceleration control mode when the vehicle controller determines that the vehicle is accelerating.

23. The method set forth in claim 21 wherein selecting the desired control mode based on the current operating conditions of the vehicle when the transmission is currently disposed in one of the reverse drive mode or the forward drive mode includes selecting the deceleration control mode when the vehicle controller determines that the vehicle is decelerating.

24. The method set forth in claim 21 wherein selecting the desired control mode based on the current operating conditions of the vehicle when the transmission is currently disposed in one of the reverse drive mode or the forward drive mode includes selecting the autostop control mode when the vehicle controller determines that the vehicle is not moving, and the engine is not being fueled and is not running.

25. The method set forth in claim 21 wherein selecting the desired control mode based on the current operating conditions of the vehicle when the transmission is currently disposed in one of the reverse drive mode or the forward drive mode includes selecting the idlestop control mode when the vehicle controller determines that the vehicle is not moving, and the engine is being fueled and is running.

26. The method set forth in claim 21 further comprising sensing if the vehicle is currently executing an autostart, with the vehicle controller, in which the engine is automatically started after the autostop without any input from an operator.

27. The method set forth in claim 26 wherein selecting the desired control mode based on the current operating conditions of the vehicle when the transmission is currently disposed in one of the reverse drive mode or the forward drive mode includes selecting the autostart control mode when the vehicle controller determines that the vehicle is not moving, and the vehicle is currently executing the autostart.

28. The method set forth in claim 26 wherein selecting the desired control mode based on the current operating conditions of the vehicle when the transmission is currently disposed in one of the reverse drive mode or the forward drive mode includes selecting the sailing control mode when the vehicle controller determines that the vehicle is not currently executing the autostart, the speed of the vehicle is greater than a threshold sailing speed value, the throttle position of the vehicle is less than a threshold sailing throttle position value, and the brake fluid pressure at each brake caliper of the vehicle is less than a threshold sailing brake pressure value.

29. The method set forth in claim 26 wherein selecting the desired control mode based on the current operating conditions of the vehicle when the transmission is currently disposed in one of the reverse drive mode or the forward drive mode includes selecting the cruising control mode when the vehicle controller determines that the vehicle is not currently executing the autostart, the speed of the vehicle is not greater than a threshold sailing speed value, the throttle position of the vehicle is not less than a threshold sailing throttle position value, or the brake fluid pressure at each brake caliper of the vehicle is not less than a threshold sailing brake pressure value.

* * * * *